(12) United States Patent
Aihara et al.

(10) Patent No.: US 8,403,215 B2
(45) Date of Patent: Mar. 26, 2013

(54) SELF SHOPPING SUPPORT BY GETTING CONTENTS FROM ELECTRONIC SHELF LABELS

(75) Inventors: Toru Aihara, Kanagawa (JP); Kohichi Kamijoh, Kanagawa-ken (JP); Noboru Kamijo, Kanagawa (JP)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 233 days.

(21) Appl. No.: 12/774,847

(22) Filed: May 6, 2010

(65) Prior Publication Data

US 2010/0287057 A1 Nov. 11, 2010

(30) Foreign Application Priority Data

May 11, 2009 (JP) .................................. 2009-115057

(51) Int. Cl.
*G06K 15/00* (2006.01)
*G06K 7/08* (2006.01)
*G06Q 20/00* (2006.01)
(52) U.S. Cl. ........................... 235/383; 705/20; 235/451
(58) Field of Classification Search ......................... None
See application file for complete search history.

(56) References Cited

U.S. PATENT DOCUMENTS

| 6,512,919 | B2 * | 1/2003 | Ogasawara ................. 455/422.1 |
| 7,152,040 | B1 * | 12/2006 | Hawthorne et al. ............. 705/16 |
| 7,357,316 | B2 * | 4/2008 | Heckel et al. ................. 235/383 |
| 2005/0067492 | A1 * | 3/2005 | Amitay et al. ................ 235/385 |

FOREIGN PATENT DOCUMENTS

| JP | 10105832 | | 4/1998 |
| JP | 2002-83368 | A | 3/2002 |
| JP | 2003-222893 | A | 8/2003 |
| JP | 2005-10853 | A | 1/2005 |
| JP | 2008-203945 | A | 9/2008 |
| JP | 2009-45222 | A | 3/2009 |
| JP | 2009-48272 | A | 3/2009 |

\* cited by examiner

*Primary Examiner* — Matthew Gart
*Assistant Examiner* — Michael Maicher
(74) *Attorney, Agent, or Firm* — Patterson & Sheridan, LLP

(57) ABSTRACT

To support a shopper to perform self-service shopping by using an electronic shelf label (ESL) while looking at actual items displayed in a store and to expand the functions of the electronic shelf label (ESL) to enable the linkage with other data processing systems expansively. A shopper uses a mobile processing device (typically, a cell phone owned by the shopper) in a store. The functions necessary to obtain contents from the electronic shelf label (ESL) are obtained by introducing an application program into the shopper's own cell phone, by which it is expected that the shopper is able to easily enjoy shopping. When photographing the electronic shelf label (ESL), the contents associated with items are encoded (the price display automatically changes to a barcode) and then decoded.

16 Claims, 18 Drawing Sheets

EXAMPLE OF ELECTRONIC SHELF
LABEL MOBILE PROCESSING DEVICE
(CELL PHONE CAMERA)
DETECTION FUNCTION
240

| COUPON ID | MANUFACTURER / STORE | ITEM ID | DISCOUNT | EXPIRATION DATE | QUANTITY LIMIT | NUMBER-OF-TIMES LIMIT | QUESTIONNAIRE |
|---|---|---|---|---|---|---|---|
| 12345 | MJLF | 4901111010239 | 9% | 10/30/2010 | 1 | 1 | AVAILABLE |
| 31126 | Q&H | ALL | 2.7% | 11/20/2009 | 5 | 2 | |
| F235A | IY001 | 4562278702339 | 1.1% | 10/30/2009 | 10 | 1 | |
| AA5C3 | IY102 | ALL | 2% | 14:00/10/22/2009 | 10 | 5 | |
| C2213 | TOUY052 | ALL | 0.5% | 18:00/12/24/2009 | 5 | 5 | |
| ... | ... | ... | ... | ... | ... | ... | ... |
| F3654 | AEOFF102 | 4562278702339 | 1.8% | 10/30/2009 | 5 | 5 | AVAILABLE |

SELF SHOPPING SUPPORT BY GETTING CONTENTS FROM ELECTRONIC SHELF LABELS

CROSS-REFERENCE TO RELATED APPLICATION

This application claims priority under 35 U.S.C. §119 from Japanese Patent Application No. 2009115057, filed May 11, 2009, the entire contents of which are incorporated by reference herein.

BACKGROUND OF THE INVENTION

1. Field of the Invention

The present invention relates to a technique of supporting self-service shopping. More particularly, the present invention relates to a method, a program, and a system in which a shopper obtains contents associated with items by using electronic shelf labels (ESL) while looking at the actual items displayed in a store, and to a mobile processing device and electronic shelf labels (ESL) enabling above.

2. Description of the Related Art

Along with an introduction of IT to the retail industry, a lot of department stores, supermarkets and convenience stores, generally introduce a POS system to perform sales, inventory, and order management. Further, the latest large stores introduce a system called electronic shelf label (ESL), which is capable of changing the prices of items all at once on a timely basis in conjunction with information from the POS system. It is mounted on items shelves in the stores and communicates with a wireless device or an infrared device placed on a ceiling or a wall.

Some states in the U.S. oblige the use of the ESL in order to prevent a difference between a shown price and a purchase price.

On the other hand, an increasing number of major supermarkets deal with home-delivery type net-supermarket services using the Internet. It is expected to expand widely in the future along with the increase of aging people since it does not require consumers to carry heavy items with them. In the net supermarkets, shoppers select and purchase items with images and prices displayed on web pages. A lot of people, however, demand to pick up and see the actual item, to check its color, size, and quality, and to be satisfied with it before purchasing. Moreover, many people want to go down to a store actually, but hate to carry a heavy cart or a basket filled with purchased items.

There is a related art document, Japanese Patent No. 4176172 disclosing a self-service shopping system, which uses electronic shelf label (ESL). This related art document briefly describes that the store prepares a portable hand-held barcode scanner to make a shopper carry it in the store and scan items on a self-service basis. The related art document includes a description of preventing a shopper from handling the scanner because these scanners may be dropped or otherwise damaged by shoppers and this type of self-service shopping system can be expensive for the store.

Admittedly, the scanner prepared by the store will be a special purpose device in the first place and a new shopper will be unfamiliar with handling the scanner. Therefore, it is possible that the scanner is broken by an unexpected operation performed by the shopper, in some cases, an erroneous operation performed by the shopper possibly causing a purchase different from the shopper's intention.

Accordingly, in the related art document, the shopper uses an item selector card for selecting items for purchase and an electronic shelf label (ESL) connected to or including a barcode reader of the card to cause the electronic shelf label (ESL), which is provided on the shelf of the items to be purchased, to read a barcode on the card. It is also possible to cancel by causing the barcode reader to read the barcode at an opposite end of the card. Although this prevents the scanner from being broken, a shopper needs to give attention to which of the two types of barcodes should be read and is not informed of the contents of purchased items so far and each price or the total price until the shopper comes to the checkout terminal.

SUMMARY OF THE INVENTION

The present invention provides methods, systems and a program product for supporting self-service shopping.

According to one aspect of the present invention, a method in which a shopper obtains contents associated with an item provided with an electronic shelf label (ESL) by using a mobile processing device in a store is provided. The method includes the steps of: encoding the contents, which are associated with the item provided with the electronic shelf label (ESL) and include price of the item, into an image and displaying the image on the electronic shelf label (ESL) by means of the electronic shelf label (ESL) responding to the mobile processing device getting close to the electronic shelf label (ESL); obtaining the displayed encoded image by using a photographing function of the mobile processing device by means of the mobile processing device; decoding the obtained encoded image by means of the mobile processing device; and storing the decoded contents into an internal memory of the mobile processing device by means of the mobile processing device.

According to another aspect of the present invention, an electronic shelf label (ESL) is provided, including: a function of displaying price of an item; a function of sensing that a mobile processing device is getting close; and a function of encoding and displaying contents, which are associated with the item and include the price of the item, wherein the state of displaying the price of the item is switched to the state of displaying the contents encoded into the image in response to sensing that the mobile processing device is getting close.

According to a further aspect of the present invention, a method of displaying an item by a shopkeeper using an electronic shelf label (ESL) is provided, including the steps of: providing the electronic shelf label (ESL) by association with an item; and displaying only a sample item in a store.

According to another aspect of the present invention, a program product causing an electronic shelf label (ESL) or a mobile processing device is provided to implement the steps of: displaying price of an item; sensing that the mobile processing device is getting close; encoding and displaying contents associated with an item and including the price of the item into an image; and switching the state of displaying the price of the item to the state of displaying the contents encoded into the image in response to sensing that the mobile processing device is getting close.

According to another aspect of the present invention, a method in which a shopper obtains contents associated with an item provided with an electronic shelf label (ESL) by using a mobile processing device in a store is provided. The method includes the steps of: encoding the contents, which are associated with the item provided with the electronic shelf label (ESL) and include price of the item, into an image and displaying the image on the electronic shelf label (ESL) at frame intervals of a specific period by means of the electronic shelf label (ESL); obtaining and decoding the displayed encoded image in synchronization with the frame intervals of the specific period by means of the mobile processing device; and storing the decoded contents into an internal memory of the mobile processing device by means of the mobile processing device.

According to another aspect of the present invention, a system in which a shopper obtains contents associated with an item provided with an electronic shelf label (ESL) by using a mobile processing device in a store is provided. The system includes: means for encoding the contents, which are associated with the item provided with the electronic shelf label (ESL) and include price of the item, into an image and displaying the image on the electronic shelf label (ESL) by means of the electronic shelf label (ESL) responding to the mobile processing device getting close to the electronic shelf label (ESL); means for obtaining the displayed encoded image by using a photographing function of the mobile processing device by means of the mobile processing device; means for decoding the obtained encoded image by means of the mobile processing device; and means for storing the decoded contents into an internal memory of the mobile processing device by means of the mobile processing device.

According to a further aspect of the present invention, a system in which a shopper obtains contents associated with an item provided with an electronic shelf label (ESL) by using a mobile processing device in a store is provided. The system includes: means for encoding the contents, which are associated with the item provided with the electronic shelf label (ESL) and include price of the item, into an image and displaying the image on the electronic shelf label (ESL) at frame intervals of a specific period by means of the electronic shelf label (ESL); means for obtaining and decoding the displayed encoded image in synchronization with the frame intervals of the specific period by means of the mobile processing device; and means for storing the decoded contents into an internal memory of the mobile processing device by means of the mobile processing device.

According to a further aspect of the present invention, a method in which a shopper obtains contents in a POS system associated with an item provided with a shelf label and makes checkout without cheating by using a mobile processing device in a store is provided. The method includes the steps of: encoding the contents in the POS system, which are associated with the item provided with the shelf label and include price of the item, into an image and displaying the image on the shelf label by means of the POS system; obtaining the displayed encoded image by using a photographing function of the mobile processing device by means of the mobile processing device; decoding the obtained encoded image by means of the mobile processing device; storing the decoded contents with time stamp information of shopper's buying behavior into an internal memory of the mobile processing device by means of the mobile processing device; transmitting the contents to a checkout server; transmitting the contents to the POS system, confirming that there is no falsification, and performing by means of the checkout server; and providing the shopper with the item in response to the checkout information by means of the POS system. According to another aspect of the present invention, a system in which a shopper obtains contents in a POS system associated with an item provided with a shelf label and makes checkout without cheating by using a mobile processing device in a store is provided including: means for encoding the contents in the POS system, which are associated with the item provided with the shelf label and include price of the item, into an image and displaying the image on the shelf label by means of the POS system; means for obtaining the displayed encoded image by using a photographing function of the mobile processing device by means of the mobile processing device; means for decoding the obtained encoded image by means of the mobile processing device; means for storing the decoded contents with time stamp information of shopper's buying behavior into an internal memory of the mobile processing device by means of the mobile processing device; means for transmitting the contents to a checkout server; means for transmitting the contents to the POS system, confirming that there is no falsification, and performing checkout by means of the checkout server; and means for providing the shopper with the item in response to the checkout information by means of the POS system.

DETAILED DESCRIPTION OF THE PRESENT INVENTION

Figure 1:
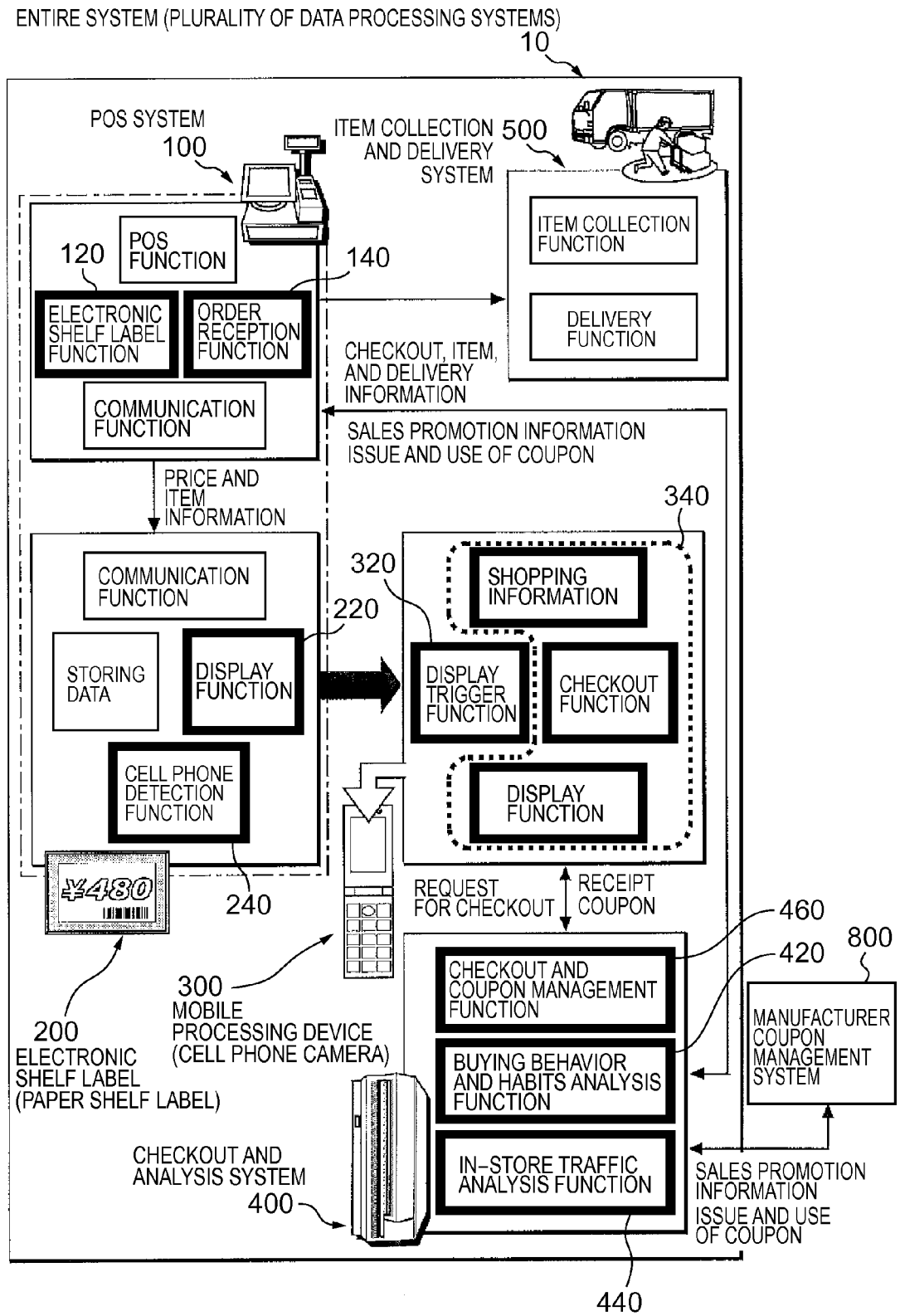
FIG. 1 is a system configuration diagram illustrating functions included in data processing systems of the entire linked system (a plurality of data processing systems) to which the present invention is applied.

A shopper uses a mobile processing device in a store. The mobile processing device is typically a cell phone owned by the shopper. The function necessary to obtain the contents in the POS system from the electronic shelf label (ESL) is available by introducing an application program into the shopper's own cell phone by downloading. Thereby, it is possible to expect that the shopper easily enjoys shopping while using information (advertisement or a coupon, for example), which the shopper is able to collect inside and outside the store with familiar cell phone operations on a routine basis. If the shopper is able to obtain contents from the electronic shelf labels (ESL) in real time, it is possible for the shopper to check a (timely) price of items to be purchased on the spot.

Typically, when photographing an electronic shelf label (ESL) by using a cell phone camera (considerably in widespread use in Japan and gradually spreading also in Europe, the U.S., and China) and an application program operating in the cell phone, related information in the POS system is encoded into a barcode and a usual price on an electronic shelf label (ESL) automatically changes to the barcode. Then the information including the price is captured and decoded by the cell phone camera (in Japan, cell phones including a barcode reader function are considerably in widespread use). Although the electronic shelf label (ESL) conventionally has had only the price display function, the related information may include item information necessary for checkout processing in addition to the price.

Further, the shopper is able to select whether to receive the packed items at the counter or to make the items delivered to home through the cell phone. Therefore, if the shopper selects delivery to home, he or she is able to return home without bringing the items.

The shopper obtains item information (or contents associated with items) in the POS system from the electronic shelf labels (ESL) provided for a series of desired items by using the cell phone and then checks out after finishing the shopping by using the cell phone. The checkout information is sent to the POS system in the store over the cell phone network, thereby enabling the linkage with other data processing systems from the item collection down to delivery of the items. It is also possible to record the photographing order and therefore expansively to analyze the buying behavior and in-store traffic of the shopper, which has conventionally been analyzed by using a security camera or the like, on the basis of the photographing time stamp of the electronic shelf labels (ESL) stored with the shopping information.

The following effects can be expected by the use of the present invention.

As a shopper is able to checkout with his/her own cell phone, a checkout terminal in a store becomes unnecessary. Therefore, shoppers do not need to make lines for checkout. This enables not only an operation in a conventional store with a combination of picking up items on a self-service basis in a conventional store and the self-service shopping system, but also radically new types of sample display store in which shoppers do not need to pick up items using the self-service shopping system.

A counter for receiving items is provided, if necessary. In that case, however, it is possible to collect items after completing checkout anywhere in the store while the shopper moves to the receiving counter, and therefore waiting time is expected to be reduced.

The receiving items are able to be smoothly handed over by issuing a reference number at the completion of each checkout and putting up, at the counter, the reference numbers in the order that the items are prepared (in the same manner as the numbered tickets in a dispensing pharmacy).

The receiving counter is also able to be totally automated (receipt of the items in a mechanism like a coin-operated locker) by issuing a numbered ticket with a barcode to the cell phone in advance for receiving and reading the barcode at the receiving counter.

The elderly and disabled persons are able to purchase items more easily by selecting the delivery only for heavy items or by performing virtual shopping (described later) on a personal computer or a television having the function of the present invention, thereby significantly reducing the shopping burden on the elderly or disabled persons.

Shoppers are able to make purchases without carrying about items. Therefore, for example, it is possible to reduce the number of carts in a small store or to eliminate the carts completely, by which shoppers are able to move smoothly in the store and to make purchases more easily, which leads to an improvement in sales of the store.

With a linkage with a sales policy (described later), as well as with those specific to the store, a shopper is able to purchase various items at low prices easily.

It is possible to provide a personal account book service, an in-store traffic analysis service, and a buying behavior and habits analysis service. Particularly, the conventional POS system can not provide the buying behavior analysis service to manufacturers who are eager to get the information such as whether a shopper purchased the item after hesitation, immediately purchased the item, or did not purchase the item after hesitation, and what are the competing items (described later in the embodiment).

It is possible to achieve new types of stores with a combination of a small store in which only sample items are displayed with a fully-automated warehouse or a show room store with a warehouse and delivery center in a remote location.

An added value of the electronic shelf label (ESL) is improved by adding the electronic item purchase function to the electronic shelf label (ESL), which has conventionally been used only as the price display of items for shoppers (The stores, which have conventionally given up the use of the electronic shelf label (ESL) due to its higher cost, will feel like investing due to the addition of the new function.)

Moreover, in the conventional self service checkout in which a shopper scans barcodes attached to items (not to an electronic shelf label (ESL)) by himself/herself at the self-checkout register, it becomes possible for the shopper to eliminate this scanning operation of individual items by downloading the shopping list at a time over the cell phone network after completing the shopping with this self-service shopping system using the cell phone. Further, the same operation can be applied to a usual checkout.

Referring to FIG. 1, there is shown a system configuration diagram illustrating functions included in data processing systems of the entire linked system (a plurality of data processing systems) 10 to which the present invention is applied. A POS system 100, an electronic shelf label (ESL) 200, a mobile processing device (typically, a cell phone camera) 300, a checkout and analysis system 400, and an item collection and delivery system 500 are able to link with one another as a plurality of data processing systems.

The present invention enables the linkage of this entire configuration of the system by adding or extending the (plurality of) functions enclosed by a thick line for transmitting information on the content server to the electronic shelf label (ESL), which has conventionally been used only to display a price, in a readable format by the mobile processing device. The shopper simply needs to introduce an application program into the shopper's mobile processing device such as a cell phone. Almost all of these functions are able to be implemented with existing hardware only by installing software and this can be how the functions are performed. The respective typical operations will be described later.

In the POS system 100, functions capable of performing the present invention are implemented as software and a content database. An electronic shelf label (ESL) function 120 generates a barcode from a database by obtaining contents related to the item or the purchase in addition to the conventional price. Although a normal POS system contains only a database of item information, an addition of new information such as a purchase means or a coupon is effectively used in the present invention.

In the electronic shelf label (ESL) 200, functions capable of performing the present invention are implemented as software, hardware, or a combination thereof, with respect to a display function 220 and a cell phone detection function 240. Generally, in the electronic shelf label (ESL) 200, the price of item (shown as ¥480 here, where ¥ is YEN, which is the Japanese currency unit) is displayed.

In the mobile processing device 300 (typically, a cell phone camera), functions capable of performing the present invention are implemented as software, hardware, or a combination thereof, with respect to a display trigger function 320 and a shopping/display/checkout function (shopping function, display function, or checkout function) 340. A shopper is able to download the display trigger function 320 and the shopping/display/checkout function 340 as application programs (software) into his or her own cell phone camera to use the functions.

The term "camera" is used for the cell phone camera because of photographing information encoded into an image, which is displayed on the electronic shelf label (ESL). Naturally, it is enough for the cell phone to have a function of a barcode reader capable of decoding the obtained encoded image, and the meaning of "camera" should not be interpreted restrictively. Further, the term "photographing" means only obtaining and decoding information from the encoded image displayed on the electronic shelf label (ESL) and the meaning should not be necessarily limited to "photographing" by a camera, but is widely applicable to general obtaining methods of information from an image.

In the checkout and analysis system 400, functions capable of performing the present invention are implemented as software, hardware, or a combination thereof, with respect to a buying behavior and habits analysis function 420 and an in-store traffic analysis function 440.

Conventionally, the electronic shelf label (ESL) 200 has been created as a display medium which is an alternative to paper (so-called a paper shelf label) for shoppers. For the reason of limited display space or of preventing the appearance from being complicated, only a price display (a sale price, a discount rate, a fixed price, or a trade name) has been provided. By adding a function of transmitting information on the content server in a format readable by the mobile processing device 300 of the present invention to the electronic shelf label (ESL) 200 to achieve a linkage with the mobile processing device 300 such as a cell phone camera, it becomes possible to transmit information including "additional information required for a purchase procedure" to the cell phone of a shopper and therefore to transmit various information "associated with items provided with an electronic shelf label (ESL)." Thus, the plurality of shown systems are linked with one another, thereby enabling a new service. The linkage between the electronic shelf label (ESL) 200 and the mobile processing device 300 is indicated by a black thick arrow.

Conventionally, the electronic shelf label (ESL) 200 previously receives price information of the item registered in the database of the POS system 100 via communication and the information is displayed on an LCD screen. In other words, a shopper just looks at the price information of the item even though the electronic information of the item obtained in conjunction with the POS system comes to the shelf. The information flow is discontinued and therefore precious electronic information is not effectively used in a life cycle of the product (for example, planning, manufacturing, sales, checkout, collection, delivery, and analysis).

"Information required for a purchase procedure" is as follows:
(a) Means of checkout selectable in store: Cash (bank account number), credit card, electronic money, and other mobile credit
(b) Method of receiving items selectable in store: Bringing items with the shopper, delivery (charged or not charged for delivery), and specification of gift-wrapping
(c) Applicable discount, coupon application information In addition, it is also possible to obtain information (a store name, a telephone number, URL, an account for checkout, for example), which is common in a store or in all chain stores and is not specialized in individual item, through barcodes (printed on paper) in the same manner from a poster separated from the electronic shelf labels (ESL) 200 (in this case, paper is permissible, though it is not shown here). It prevents the information from being encoded in detail into the individual electronic shelf labels (ESL) 200. Further, it is also possible to perform discrete checkout transaction for each shop with a degree of freedom on display in that, even in the case where managing and selling shops (tenants) differ from shelf to shelf in the same store.

Figure 2:
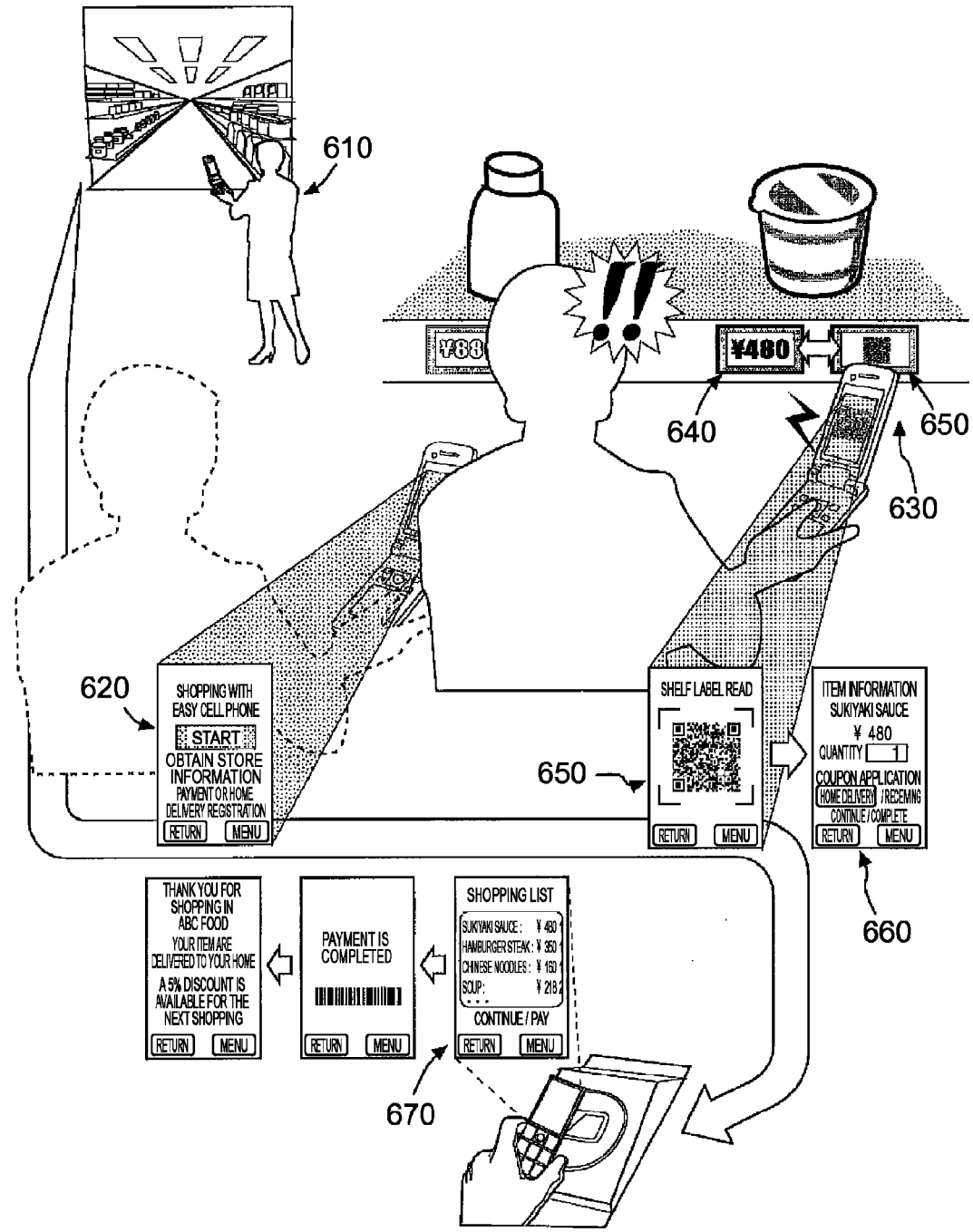
FIG. 2 is an image diagram illustrating a process in which a shopper obtains contents associated with items by using electronic shelf labels (ESL) while looking at the actual items displayed in a store through a cell phone camera according to the present invention.

FIG. 2 shows an image diagram illustrating a process in which a shopper obtains contents associated with items through the use of electronic shelf labels (ESL) while looking at actual items displayed in a store by using a cell phone camera according to the present invention.

In this image diagram, actual items are displayed on shelves in the store when the shopper enters the store, where generally the electronic shelf label (ESL) 200 is provided for each item. In a conventional supermarket, it is necessary to prepare and display a plurality of an item in reserve at a minimum necessary quantity for measuring up to the sale and to replenish the item appropriately. On the other hand, only one sample item placed all the time on the shelf works for the display, considerable space saving is expected.

A function necessary to obtain contents from the electronic shelf label (ESL) 200 is available by introducing an application program into the shopper's own cell phone (for example, by downloading). For example, as indicated by 610, a barcode for downloading is displayed at the entrance of the store, so that the shopper is able to previously download software into the cell phone via wired or wireless communication. It is also possible to display a two-dimensional barcode including a download site of the application program at the entrance of the store, so that the shopper downloads the software from the server through a cell phone network by scanning the two-dimensional barcode with the cell phone.

This application is basically common in all stores and used in the store or in the chain stores after getting the above store unique information. As indicated by 620, the display "shopping with easy cell phone (raku raku keitai)" appears on the screen of the cell phone and the shopper is able to start shopping by moving the cursor to the "Start" place. Typically, the shopper holds up the cell phone over the electronic shelf label (ESL) as indicated by 630 during shopping.

In this specification, the term "an item provided with the electronic shelf label (ESL)" does not necessarily mean an item with the electronic shelf label (ESL) provided (physically) near the item. Please note this point.

In response to sensing that the cell phone 300 is getting close to the electronic shelf label (ESL) 200, the price (¥480) 640 of the item displayed on the electronic shelf label (ESL) 200 changes to a two-dimensional barcode 650. This occurs because the electronic shelf label (ESL) 200 has the cell phone detection function 240 (FIG. 1). Besides the price, contents associated with the item are able to be encoded into an image and be displayed.

There are two methods of displaying a two-dimensional barcode on the electronic shelf label (ESL) 200. One is a method in which the POS system 100 generates a two-dimensional barcode (an encoded image) and transmits the barcode to the electronic shelf label (ESL) 200 and the electronic shelf label (ESL) 200 displays the transmitted barcode simply by using the display function 220. The other is a method in which the POS system 100 prepares and transmits only required data and the electronic shelf label (ESL) 200 generates the barcode. The former requires small load on the electronic shelf label (ESL) 200, though the time stamp information is not able to be included in the information. The latter enables the time content to be included in the information, though large load is imposed on the electronic shelf label (ESL) 200 because the barcode is generated from the data every time the data is received.

In this respect, there can be two cases for the meaning of the term "electronic shelf label (ESL)." One case is where electronic shelf label (ESL) means only the electronic shelf label (ESL) 200. The other case is where the meaning of electronic shelf label (ESL) includes the POS system 100 (particularly, the electronic shelf label (ESL) function 120) in addition to the electronic shelf label (ESL) 200 (the POS system 100 and the electronic shelf label (ESL) 200 are enclosed by a long dashed short dashed line).

The displayed encoded image is obtained by using the photographing function (the function of a barcode reader) originally owned by the cell phone 300. In response to decoding of the obtained encoded image, a content (at least a part thereof) necessary for the shopper to make a selection for shopping is displayed at 660 (other information necessary for checkout and buying behavior and habits analysis is also encoded in the barcode). If the barcode is successfully read (in other words, decoded), the trade name and the price are displayed on the screen and the shopper inputs the quantity, selects between receiving and delivery to home, confirms the purchase, and registers the item in the shopping list. The decoded content is stored in an internal memory of the cell phone 300, though naturally the content may be stored in an external memory connected to the cell phone only if the memory is able to store the content.

In this respect, the term "internal" should be widely construed. In the step of checkout after completing all purchases, the shopping list as indicated by 670 is displayed and the control shifts to checkout. While it is shown that the cell phone is held up over an electronic money terminal (considerably popular in Japan) at 670, generally the shopper is able to checkout with the cell phone via a telephone network. Moreover, the description like "Checkout is completed" indicating the completion of the checkout is displayed along with, for example, a one-dimensional barcode (the use thereof will be described later).

Upon completion of all purchases, the shopping list is displayed for the final confirmation and then the information is transmitted to the checkout function. The checkout function communicates with the checkout and analysis system 400 (FIG. 1), in which the cell phone is previously registered, transmits the shopping information including the time stamp. The checkout and analysis system 400 generates and transmits the shopping list to the order reception function 140 of the POS system 100 to check the contents (stock or price falsification) and then pays the amount to the account number obtained from the barcode.

Discount information (a store coupon, a coupon common in a shopping center, and a manufacturer coupon) is also applicable at the time of reading the barcode regarding the discount information already obtained by the cell phone (the discount information may include an option such as a time service or a discount by a combination sale with items, which the store wants to promote). The shopper may attempt to start with just looking to check the discount information by temporarily holding up the cell phone over the electronic shelf label (ESL) to decode discount information (hidden to the naked eye), which may be advantageously applicable only to the shopper.

For example, in a store which accepts buying history based electronic coupons from stores and manufacturers, the shopper first checks the price of the item if the shopper is to purchase the item. It is very important to analyze the shopper's buying behavior. With reference to the time stamp thereof, it is possible to analyze the shopper's buying behavior (whether the shopper purchased the item after hesitation, immediately purchased the item, or did not purchase after hesitation and what are the competing items). On the other hand, regarding discount information not obtained yet by the cell phone, discounts may be applied at the time of communication with the checkout and analysis system.

The shopper is also able to actively check the latest discount information. When checking the price of an item, which the shopper is interested in purchasing, the shopper is able to refer particular discount information effective only for the item, store, time, or shopper via a network and to download an intended coupon. Because the number of shoppers is limited, it is possible to present the shoppers with better discounts according to the buying history than coupons intended for the general public. Further, on the premise of a purchase of specific items, it is possible to present a discount depending on the order of purchases, which will promote the purchase of the same or different items in a format in which the shopper easily finds the discount information.

In the normal combined discount, the shopper is required to use the purchase procedure at a time in one checkout unit though any order of purchases is acceptable. Moreover, in a traditional advertisement, the combination pair for promotional sales is generally fixed and lacks flexibility in order to simplify the advertisement pattern due to limitations of paper space, and the discount information is often presented along with many advertisements in which the shopper is not interested. It is possible to present purchase promotion information in accordance with the shopper with a focus on items in which the shopper is interested.

Moreover, if the shopper is dissatisfied with the shown price and requires a further discount, the shopper inputs a desired price, by which the system presents a corresponding purchase condition (a target value of Today's purchase total amount, a purchase of other recommended items, or a purchase of multiple pieces) and the shopper is able to download a coupon corresponding to the purchase condition. These conditions are dynamically determined in consideration of shopper's long-term or short-term buying history, a stock status, a sales promotion status, and a shopper's wish list, and therefore even if a reference is made about the same items, the result differs depending on the shopper.

Furthermore, it is also possible to add a condition determined based on other than the buying behavior of the shopper to these conditions. For example, it is possible to introduce a mechanism in which shoppers in the store make a group purchase. For example, in a situation where item A is offered for sale at a unit price of 100 yen in units of one piece and at a unit price of 80 yen in units of 50 pieces and if there are several shoppers who want to purchase the item A at a unit price of 90 yen in units of 30 pieces, at a unit price of 80 yen in units of 15 pieces, at a unit price of 70 yen in units of 20 pieces in the store together, an adjustment is made to sell the desired number of pieces to all shoppers who want to purchase the item A at a unit price of 90 yen and 80 yen and to sell only five pieces to the shoppers who want to purchase the item A at a unit price of 70 yen, thereby increasing the shoppers' satisfaction level and boosting sales.

In the case of a lack of item for all the shoppers who want to purchase the item with the same price presentation, the purchasers are determined on the basis of the order of reception, the order of entering the store, or the priority based on the buying history (the past purchased amount or the purchased amount of the day, for example). In some cases, a change of the priority in price based on the buying history is effective to increase the royalty to the store. It is possible to estimate those who want to purchase the item in the store by utilizing an inquiry event of an item price and a checkout completion event of the purchased item.

In each case, the effectiveness of the read barcode (the account number or price), the applicability of discount (true or false and the confirmation of applicable conditions), and the application method (a reduction in purchase amount, an issue of coupon, or a transfer payment or other refunding) are confirmed by a checkout and coupon management function 460 at the time of communication with the checkout and analysis system 400.

A shopper will evaluate the price displayed on the electronic shelf label (ESL) 200 as an important element for purchasing items. When photographing the price on the electronic shelf label (ESL) 200 with the cell phone camera 300, the shopper is able to record the time stamp information (time content) at the same time. The time stamp information may be supplied from some reference clock through the electronic shelf label (ESL) 200 or may be supplied from a clock built in the cell phone camera 300.

In fact, if it is required to prevent a shopper from falsifying time stamp information in order to restrictively and strictly apply an option such as time service (a service of providing items with the prices thereof discounted only during a specific time slot), the former will be safer than the latter as an encoded subject is located upstream of the electronic shelf label (ESL) 200 and is able to be provided after encoding. These enable the electronic information from the POS system 100 to be used in the entire product life cycle of planning, manufacturing, sales, checkout, collection, delivery, and analysis by getting new attribute information via the shopper's cell phone and to be developed so as to be used to analyze the in-store traffic and the shoppers' buying behavior and habits.

Figure 3:
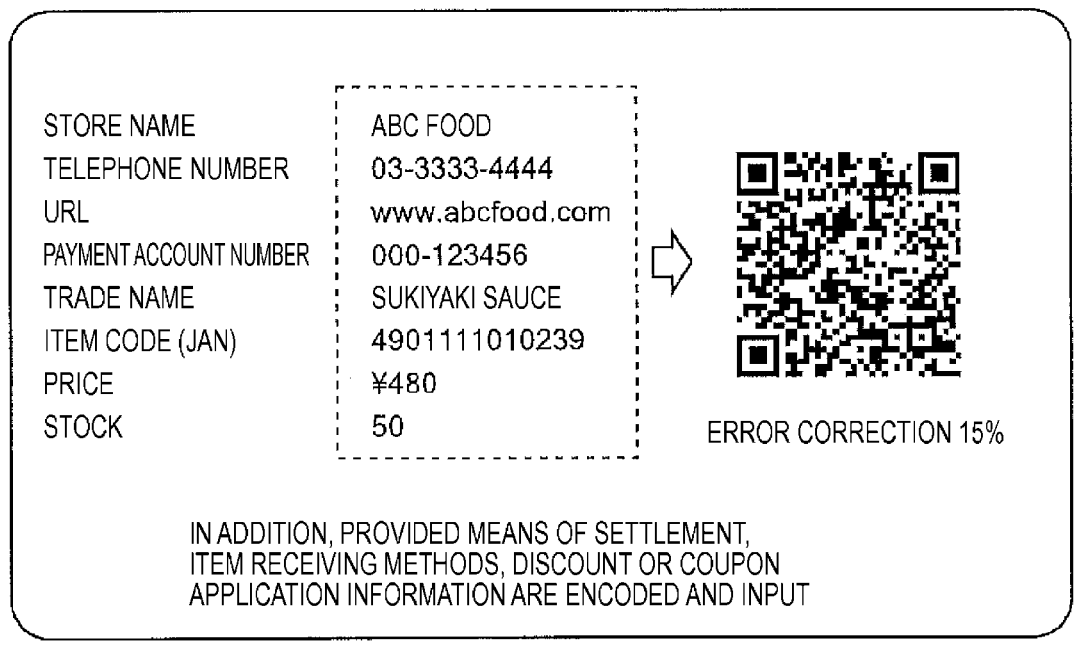
FIG. 3 is a diagram illustrating an example of information on a two-dimensional barcode encoded into an image and displayed on the electronic shelf label (ESL).

Referring to FIG. 3, there is shown a diagram illustrating an example of information on a two-dimensional barcode encoded into an image and displayed on the electronic shelf label (ESL). In this figure, QR Code, which is the most popular type of two-dimensional barcodes in Japan, is shown. The QR Code includes information such as "additional information necessary for a purchase procedure" and "associated with the item provided with the electronic shelf label (ESL)." In fact, information which does not change (which is not so variable), such as store information, may be put on the shelf by means of a paper label as information applied in common in the store separately from the electronic shelf label (ESL).

Also in this respect, the term "an item provided with the electronic shelf label (ESL)" in this specification does not necessarily mean an item with the electronic shelf label (ESL) provided (physically) near the item. Although the two-dimensional barcode is used here, another encoding technique may be used to make a change on the image by displaying a watermark such as a woven pattern on a price display part or the background thereof. In this case, it is also possible to add information of 4 Kbit or so with a QVGA camera by using the woven pattern.

Moreover, if the information is too large when using one two-dimensional barcode, a plurality of two-dimensional barcodes may be sequentially displayed according to the specification of the shopping application of the cell phone.

Figure 4:
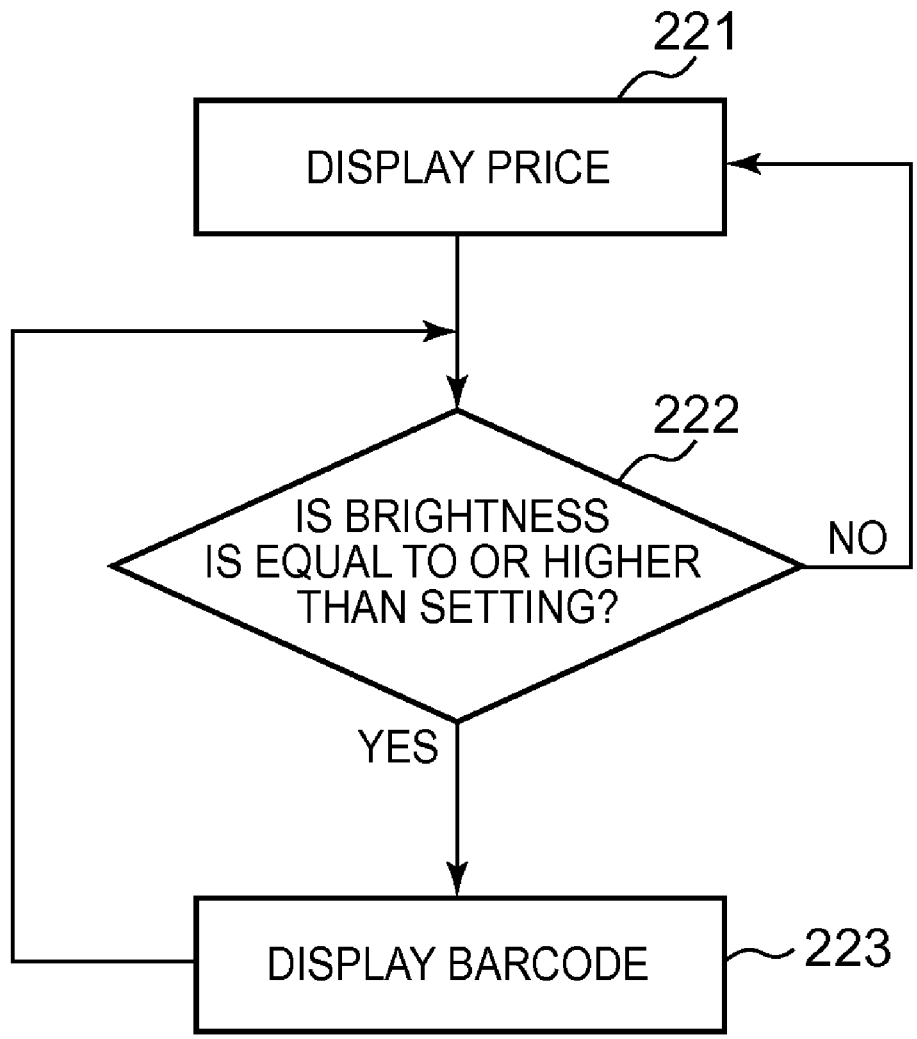
FIG. 4 is a flowchart illustrating a typical operation of an electronic shelf label (ESL) display function which responds to a flash of the cell phone camera.

Referring to FIG. 4, there is shown a flowchart illustrating a typical operation of an electronic shelf label (ESL) display function, which responds to a flash of light from the cell phone camera. Although normally displaying a price in step 221, the electronic shelf label (ESL) 200 switches the display to a barcode display in step 223 upon sensing that the cell phone is coming close to the electronic shelf label (ESL) 200 such that, for example, the brightness is equal to or higher than the setting in step 222 taking a cue from lighting of the white LED mounted on the cell phone camera.

The brightness may be sensed in terms of the absolute magnitude thereof or may be relatively sensed in terms of an amount of change from the brightness in the surrounding environment. When the brightness becomes lower than the setting because the white LED is turned off or the cell phone, which has been held up moves away from the electronic shelf label (ESL) 200, the normal price display is resumed. In addition, with the setting of maintaining the barcode display only for several seconds during which the shopper's cell phone reads the two-dimensional barcode with a cue from lighting of the white LED, the barcode display is able to be maintained by flickering the white LED at time intervals each of which is shorter than several seconds, thereby moderating the phenomenon of a reflection of light from the white LED on the barcode display surface, which dazzles the eyes.

Figure 5:
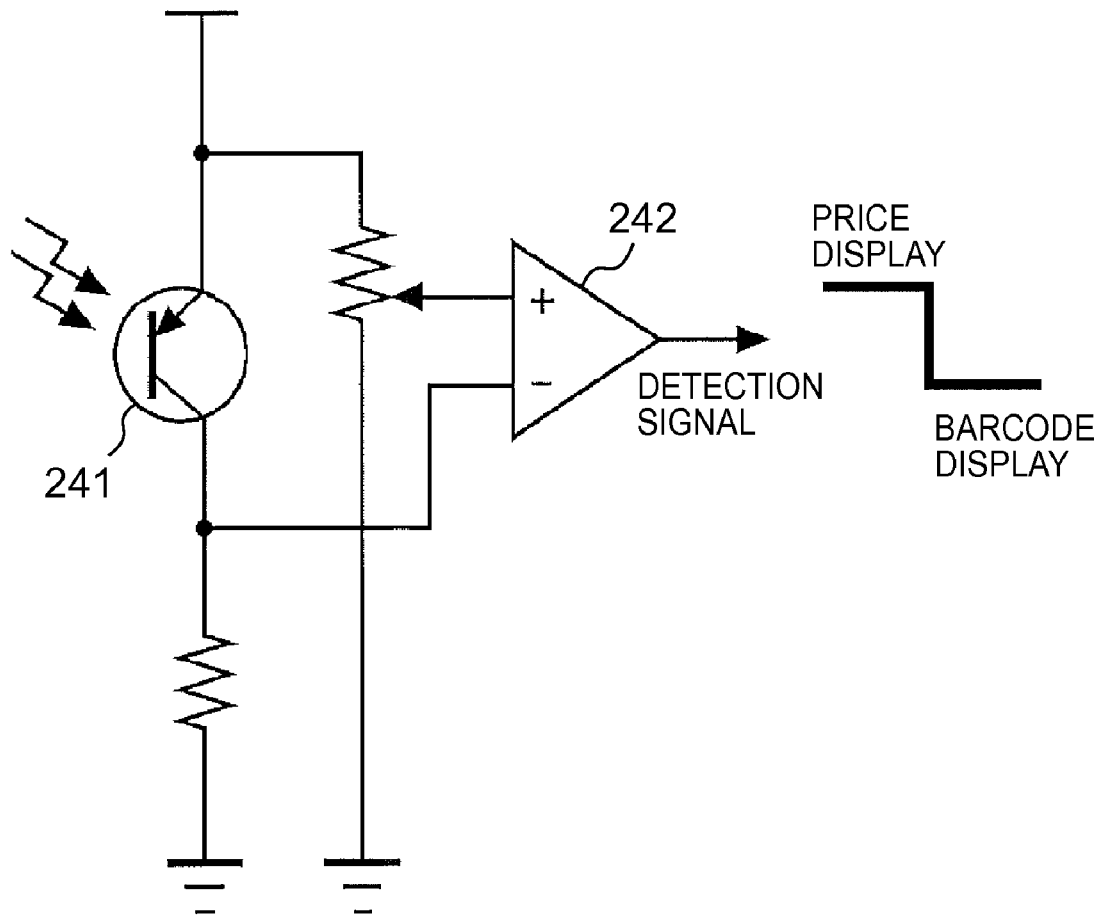
FIG. 5 is a schematic diagram for achieving a cell phone detection function of the electronic shelf label (ESL).

FIG. 5 shows a schematic diagram for implementing the cell phone detection function 240 of the electronic shelf label (ESL). As an example of a method of implementing the cell phone detection function 240 (FIG. 1), the application program turns on the white LED mounted on the cell phone camera as a flash light at the photographing time and it is detected by the electronic shelf label (ESL) using a photoresistor (for example, a CdS photoconductive cell), or a phototransistor. In addition, a typical Japanese cell phone camera is adapted to make a shutter sound at photographing to prevent a sneak shot and therefore the sound (preferably changed to ultrasound beyond the audible range) may be detected with a frequency sensitive switch (the sound is controlled at the time of photographing by using the application program software (SW)).

Alternatively, a small magnet may be attached to the side of the camera of the cell phone so that a magnetic sensor detects the magnet or an infrared sensor may detect that the hand holding the cell phone is coming closer. The electronic shelf label (ESL) may detect approaching or bumping of the hand mechanically. Furthermore, there is also a method of recognizing the image of the shape of the cell phone, sensing the intensity of transmitted radio waves, or sensing a temporal change in the image or the intensity. Moreover, a close proximity wireless technology such as FeliCa or NFC may be used to utilize a mechanism for obtaining information with the proximity of the cell phone used as a trigger (for example, a mechanism similar to obtaining a coupon of a restaurant). Furthermore, a combination of the plurality of techniques may be applicable.

Moreover, it is also possible to use this function to obtain layout information of items or to find an electronic shelf label (ESL) misplacement by adding a function of recording the time stamp in the electronic shelf label (ESL) and comparing the position information in the store with the on and off time stamp of floor lighting. In addition, those skilled in the art will conceive various modes without a limitation to the above as a technique for sensing that the cell phone is "coming close to the electronic shelf label (ESL)" or techniques related thereto.

There can be a mode of omitting the cell phone detection function 240. In this case, the electronic shelf label (ESL) 200 has a function of displaying an encoded image with specific frame intervals (preferably the frame intervals are invisible to the naked eyes of a human being like a subliminal effect), and the cell phone has a function of obtaining and decoding the encoded image in synchronization with a period of the frame interval in conformity to the function. This gives the illusion of only the normal price display provided to the shopper's naked eye.

Figure 6:
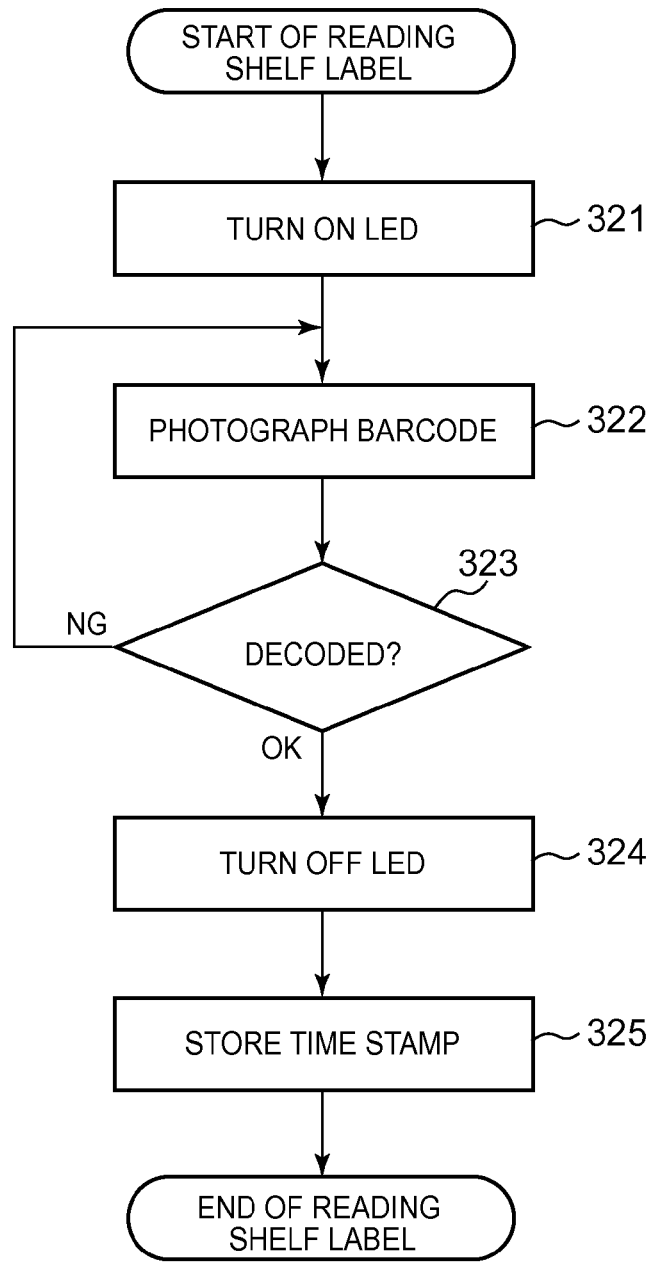
FIG. 6 is a flowchart illustrating a typical operation of a display trigger function in the cell phone using a white LED flash.

FIG. 6 shows a flowchart illustrating a typical operation of a cell phone display trigger function using the white LED of the cell phone. The white LED mounted on the cell phone camera is turned on in step 321, the barcode is photographed in step 322, and the decoding is repeated until a success occurs in step 323. There are a lot of models of cell phones capable of automatic focusing and therefore in many cases this process is completed only by moving the cell phone so that the encoded image (the entire two-dimensional barcode) enters the display screen of the cell phone. If the decoding is successful, the LED is turned off in step 324 and the time stamp (information) is stored in step 325, by which the reading of the electronic shelf label (ESL) 200 ends.

Figure 7:
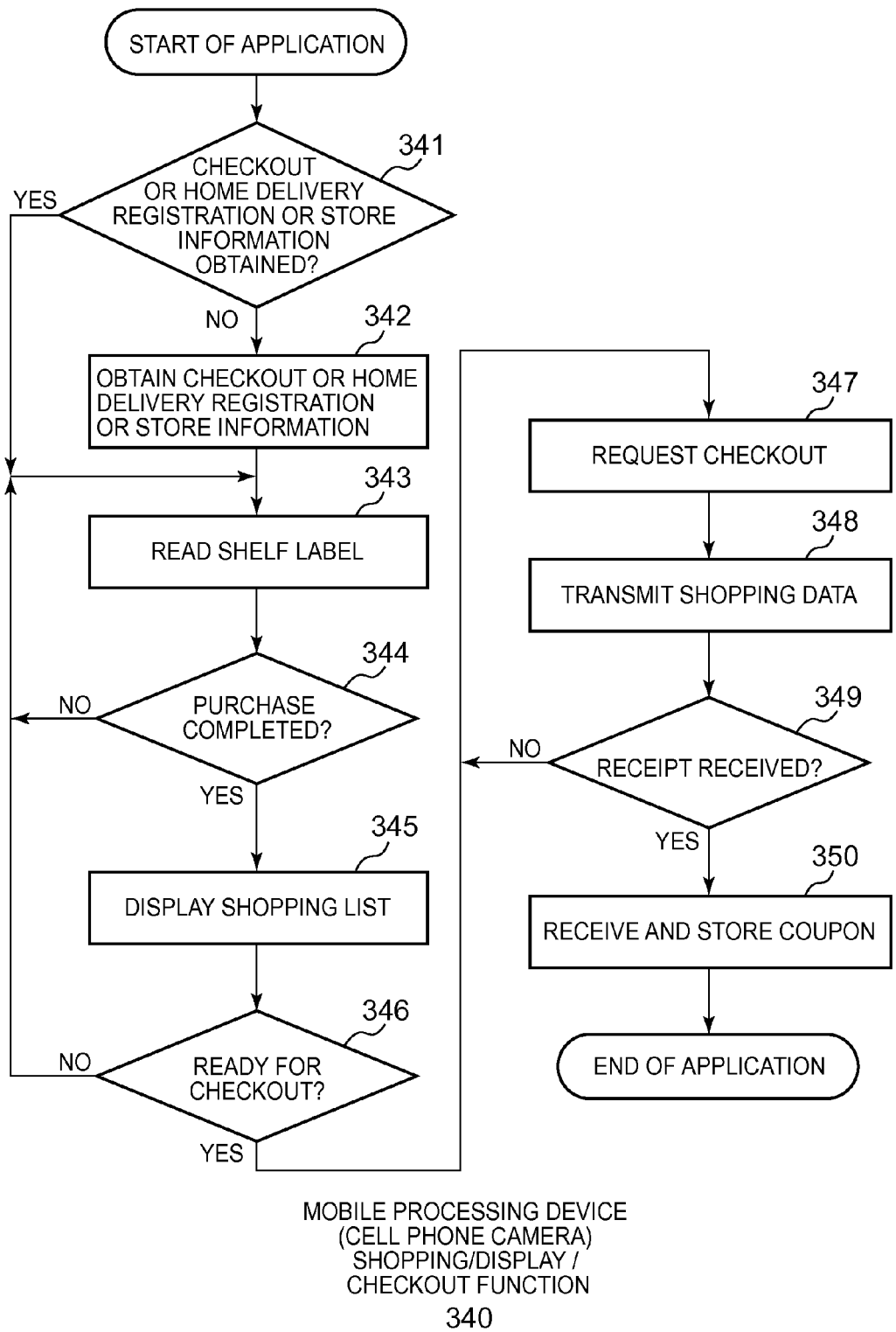
FIG. 7 is a flowchart illustrating a typical operation of a shopping/display/checkout function of the cell phone.

FIG. 7 shows a flowchart illustrating a typical operation of the shopping/display/checkout function 340 of the cell phone. In step 341, it is checked whether the checkout or home delivery registration, or the store information is obtained. If the registration or information is not obtained yet, the checkout or home delivery registration, or the store information is obtained in step 342. After the reading of the electronic shelf label (ESL) 200 is repeated (by shopper's purchases) in step 343 and it is checked whether to complete the shopping in step 344, a shopping list is displayed for the first time in step 345 and checkout is completed in step 346. A checkout request is issued to the checkout and analysis system 400 in step 347 and the shopping information including time stamps is transmitted in step 348. Then, the cell phone receives a receipt in step 349 and receives and stores a coupon from the checkout and analysis system 400 in step 350. If dishonesty such as falsification is found in the read price or in the used coupon, it is displayed and some measure is taken in this phase.

Figure 8:
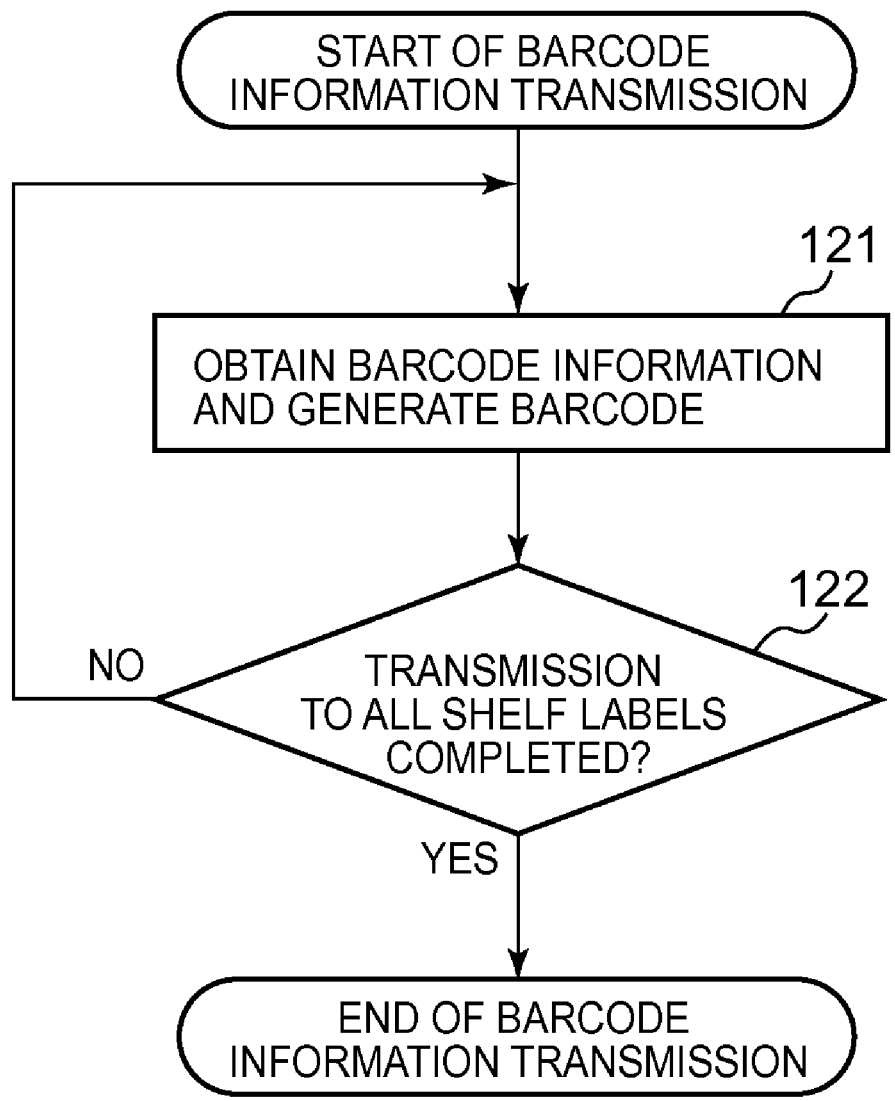
FIG. 8 is a flowchart illustrating a typical operation of an electronic shelf label (ESL) function of a POS system.

FIG. 8 shows a flowchart illustrating a typical operation of the electronic shelf label (ESL) function 120 of the POS system. In step 121, information for generating a barcode (FIG. 3) is obtained from the content server and the barcode is generated. This process continues until the completion of the transmission to all related electronic shelf labels (ESL) in step 122.

Figure 9:
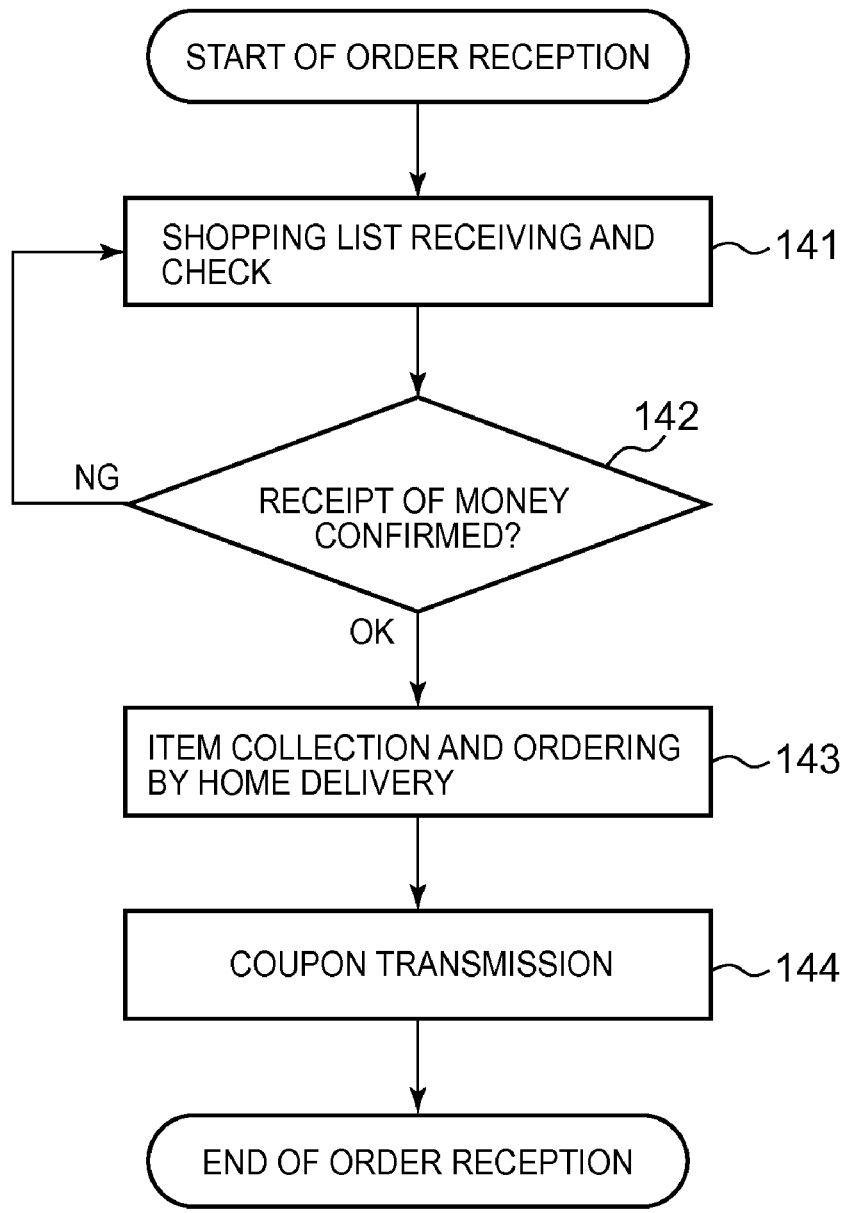
FIG. 9 is a flowchart illustrating a typical operation of an order reception function of the POS system.

FIG. 9 shows a flowchart illustrating a typical operation of the order reception function 140 of the POS system. The POS system receives the shopping list from the checkout and analysis system 400 and checks the items and prices in step 141. Upon the confirmation that the money is received in step 142, item collection and ordering are performed in step 143 and coupons are transmitted to the checkout and analysis system 400 in step 144. In the case where price falsification of items is found, the checkout and analysis system 400 is notified of the falsification and checkout is performed only for the valid items on the shopping list.

Figure 10:
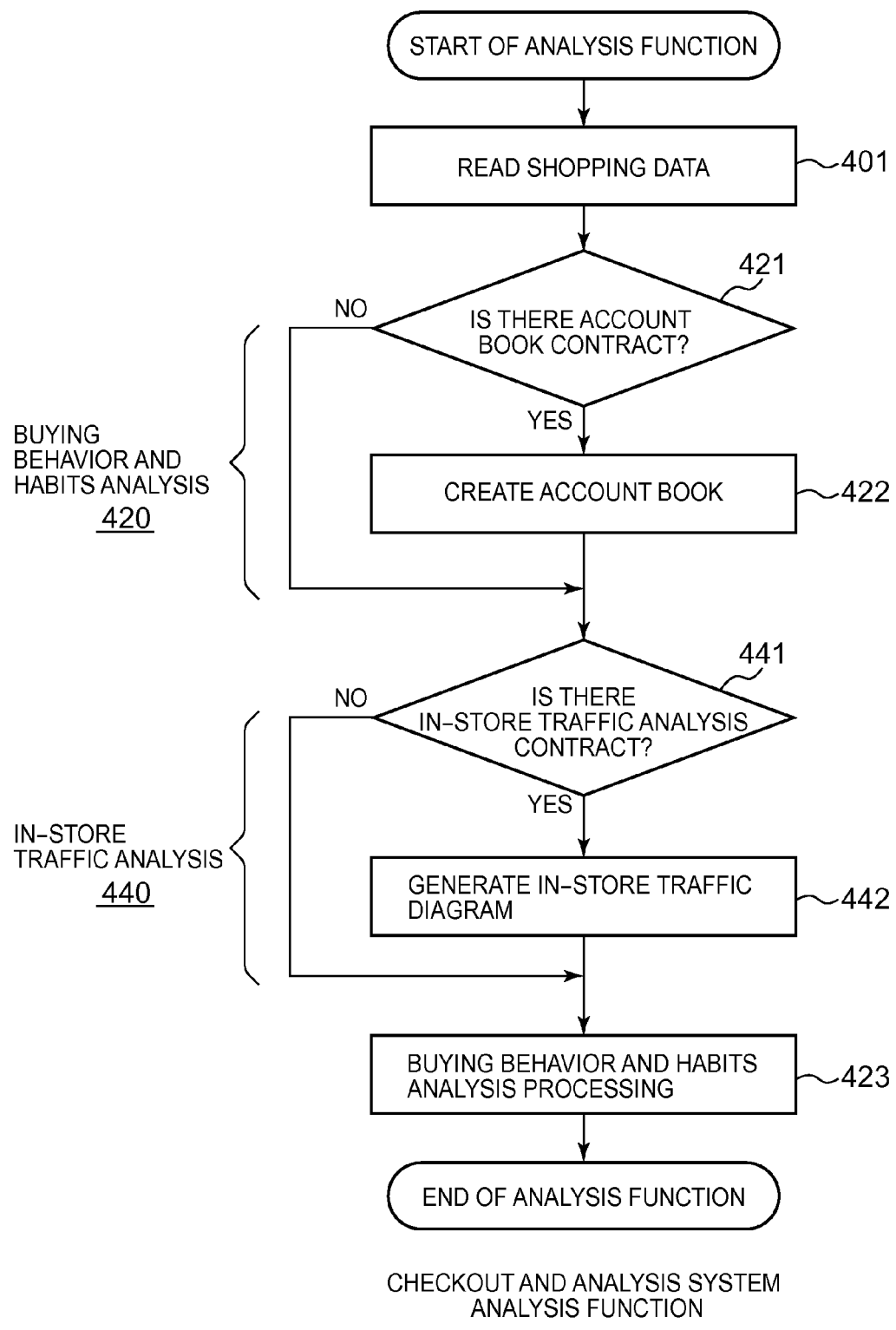
FIG. 10 is a flowchart illustrating a typical operation of a checkout and analysis system analysis function.

FIG. 10 shows a flowchart illustrating a typical operation of the checkout and analysis system analysis function. The shopping list is read in step 401 and it is checked whether there is an account book contract with the shopper in step 421. If there is the contract, the account book is created in step 422. This service is provided as the buying behavior and habits analysis function 420 and the (personal) account book service is provided after accumulating data for each shopper. The account book service includes providing health management based on the features of the purchased items and traceability information for items.

Subsequently, it is checked whether there is an in-store traffic analysis contract with the store in step 441. If there is the contract, an in-store traffic diagram is generated in step 442. In step 423, buying behavior and habits analysis processing is performed.

These are information providing services for stores and manufacturers realized in the buying behavior and habits analysis function 420 and the in-store traffic analysis function 440.

Figure 11:
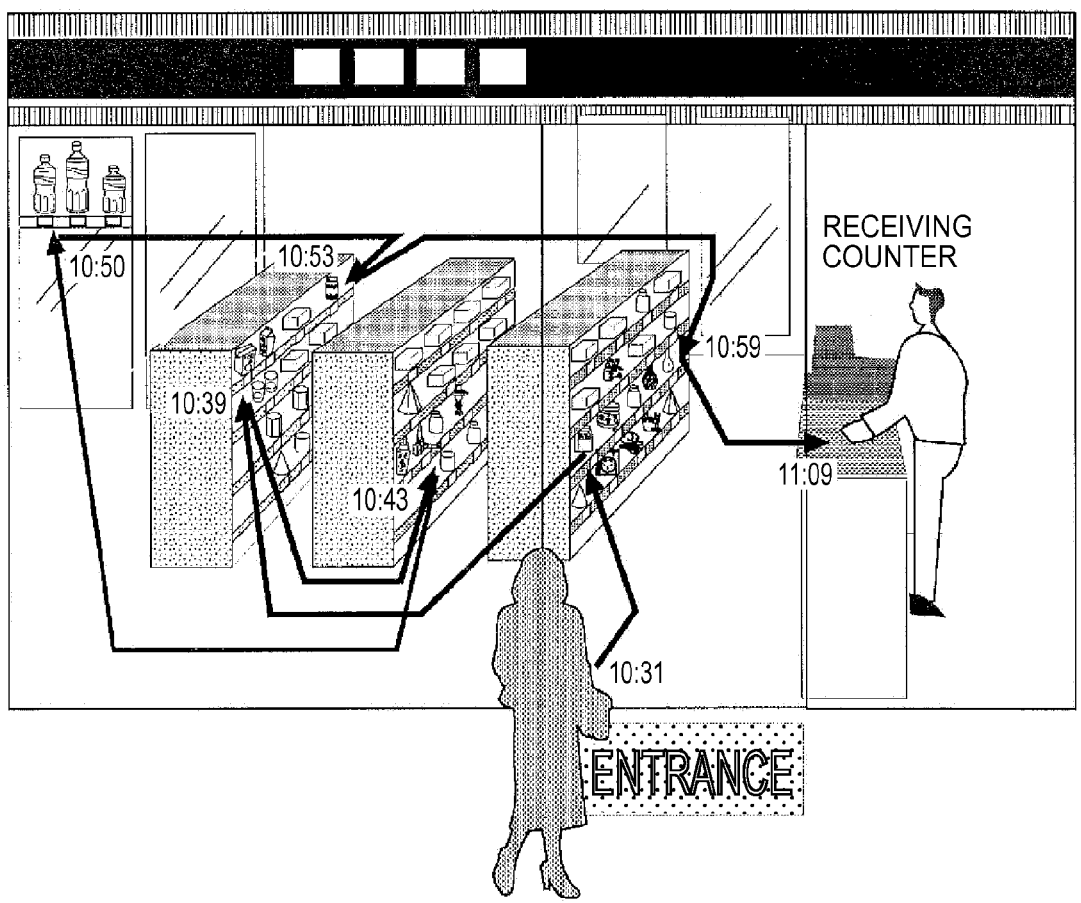
FIG. 11 is an example of an in-store traffic diagram of a shopper.

FIG. 11 shows an example of an in-store traffic diagram. A shopper enters the store at 10:31 (ten thirty-one) and obtains contents associated with items from the electronic shelf labels (ESL) at the time points, 10:39, 10:43, 10:50, 10:53, and 10:59, respectively, and they are recorded as time stamp information. It is also possible to record that the checkout is performed at the time point 11:09 in the end. Therefore, the order of photographing is recorded, too.

Data used for both the buying behavior and habits analysis 420 and the in-store traffic analysis 440 may be the shopper's purchase patterns which the shopper wants to keep confidential as personal information in a normal situation. It is expected, however, that an incentive works as follows: If the (personal) account book creation service is provided to the shopper in exchange for offering the data to a different data processing system, the shopper may cooperate with the provision of the data. In this regard, the determination of whether to transmit the contents stored in the internal memory to the different data processing system is preferably entrusted to a shopper such that the transmission is performed in response to a shopper operation. Naturally, if an approval or confirmation has already been obtained from the shopper, the subject who actually performs the transmitting operation (presses a switch or a button to trigger the operation) does not need to be the shopper. It is also possible to cause the computer to perform the operation automatically. In this respect, the term "shopper operation" should be widely interpreted.

By using the data of the in-store traffic analysis 440, the optimum layout (display) of items is achieved. As apparent from the display on the shelves shown in FIG. 11, the sales of items significantly depend on the depth of a shelf and the position or height in the shelf where the items are displayed, which is well-known in the industry.

Returning to FIG. 1 to look back on the overall flow, the linkage of the plurality of data processing systems will be described. The checkout and coupon management function of the checkout and analysis system 400 transmits the shopping list to the POS system 100 of the store to check the contents, communicates with a normal mobile banking server to checkout from the shopper's account to the account of the store where the shopper made a purchase, and transmits a receipt to the shopping function 340 of the cell phone 300 to complete the checkout. The POS system of the store is able to send back coupon information to the shopping function 340 of the cell phone 300 via the checkout and analysis system 400 in order to apply, for example, a discount of 5% for all items in the next shopping. Sales promotion such as a bulk purchase discount or a combined purchase discount may be performed.

Moreover, if a traditional checkout method (cash or a credit card, for example) is permitted, an automatic account settling machine (as in a self-service gas station) is installed in the store. A shopper makes the checkout information displayed with a barcode and causes the account settling machine to read the barcode to make checkout. The account settling machine displays a barcode equivalent to an electronic receipt or transmits a receipt via e-mail to the shopper, by which the checkout procedure is completed.

In obtaining store information, common information in the store can be obtained from notices on the wall, for example. It is also possible to obtain a public key of the store. In checkout registration, a shopper registers the means of checkout, which he or she wants to use (checkout with a cell phone, a credit card, or cash).

The POS system 100 of the store transmits information of the shopping list to the item collection and delivery system 500 after confirming the paying-in information. The item collection and delivery system 500 collects items and packs them on the basis of the information of the shopping list and then ships them to the receiving counter or to a home-delivery service.

After finishing the shopping, the shopper receives specified items at a receiving counter or a drive-through. The items selected to be delivered to home are delivered to the address registered in the home delivery registration. If all items are selected to be delivered to home, the shopper may return home directly. Thereby, the shopper is able to make purchases only with a cell phone without carrying about heavy items. Also the shopper is able to receive the (personal) account book service.

Although the present invention suggests a new retail business style, the invention is also applicable to a supermarket having the conventional self-checkout registers. In this case, for example, a shopper makes checkout by way of a cell phone and then causes a self-checkout machine to read a one-dimensional barcode (FIG. 2) of the checkout information displayed on the screen (the self-checkout machine which uses the one-dimensional barcode is popular in Japan). Thereafter the shopper brings home the items in a plastic disposable shopping bag as usual. Similarly to the normal confirmation of the items, the self-checkout register is able to be adapted to check that the correct (not wrong) items are put in the bag by comparing (a combination of) the weights of the items included in the shopping list found from the read one-dimensional barcode. The weights of the items are actually measured sequentially at the self-checkout register (if the items are packed sequentially, the total weight changes with items added anew).

Moreover, it is also possible to increase the efficiency of the packing by posting a notice stating that a person who is considered to be a trusted shopper (who does not package incorrect items or is honest) in consideration of a comparison result based on a history analysis is allowed to decrease the frequency at which the items are packed one by one and to put all items in a bag all together before returning home.

INDUSTRIAL APPLICABILITY

Figure 12:
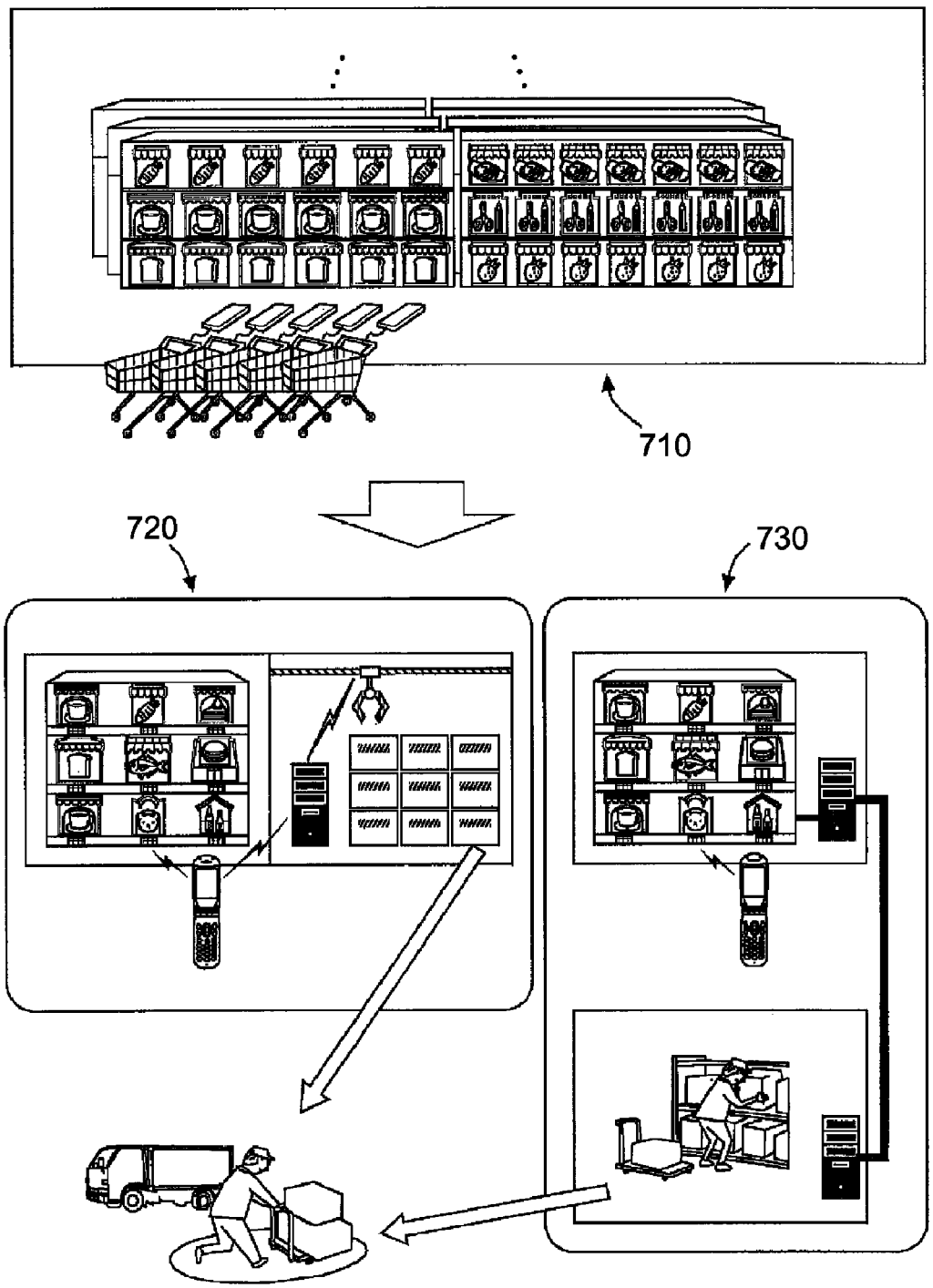
FIG. 12 is a schematic diagram illustrating a form into which the store condition can be changed according to the present invention.

FIG. 12 shows a schematic diagram illustrating a form into which the store condition can be changed according to the present invention. Currently a lot of department stores, supermarkets, and convenience stores adopt the form as shown at 710. Specifically, a large number of items are displayed on shelves, sorted according to different items of different companies and each shopper collects items into a cart in this form. According to the present invention, however, the stock of items is able to be stored in another place, and there is only one sample item with one electronic shelf label (ESL) (in a sales floor/in a store) at 720. In other cases, the store may be a showroom in which only sample items are displayed. If only sample items (and electronic shelf labels (ESL)) are placed, a neater sales floor is achieved in the store.

Moreover, if the electronic shelf label (ESL) 200 is linked with the buying behavior and habits analysis function 420 of the checkout and analysis system 400 so as to develop new showroom business in which manufacturers provide sample items, it is possible to provide a service in which a shopper is able to purchase an item from a store which offers the lowest price. With the use of an affiliate model at 730, the showroom does not need to have stocks and it is possible for the checkout and coupon management function to automatically send money, for example, of several percent of the purchase price to the account of the showroom as a margin with remote communication.

According to the present invention, a shopper is able to use this self checkout system only by downloading a (shopping) application program into the cell phone. By linking the application program with the policy of each store visited by the shopper, it becomes possible to provide the shopper with a service in real time (for example, if the same item is lower-priced in any other store, the price of the item is reduced; if a shopper gets a discount in the case of a set purchase, the shopper is informed of the discount to promote more purchases; and even in the case of the same barcode, the price and service are flexibly changed by a linkage with the coupon, time, shopper's history, and stock), thereby enabling a more accessible service close to the optimum solution which satisfies both of the store and shoppers.

Moreover, if the cell phone detection function and the display function of the electronic shelf label (ESL) are mounted on a personal computer (PC) or a television, the present invention is also applicable to virtual shopping and online shopping. For example, if the item, which a shopper is able to purchase without looking at the actual item (for example, a periodically purchased magazine, newspaper, a PC with known specification, canned food with which the shopper does not need to be sensitive about freshness, or instant noodles) are aired on television or displayed in a virtual shopping center in Second Life and the shopper brings the cell phone close to the screen of the item in which the shopper is interested, for example, a part of the bottom right corner of the screen of the television or the PC changes to a barcode similarly to the above, by which the shopper is able to purchase the item by photographing the barcode with the cell phone. Online shopping is presented on the large screen of TV or in Second Life in this manner, by which the shopper is able to have a virtual experience as if he or she were actually in the store for shopping advantageously in comparison with simple Web online shopping. Moreover, a person who finds it burdensome to go to the store such as the elderly is able to purchase items easily.

In addition, if the cell phone detection function 240 and the display function 220 of the electronic shelf label (ESL) 200 are mounted on a certain cell phone, checkout is able to be performed between a plurality of cell phones. This idea leads to using a certain cell phone as an electronic shelf label (ESL). If the conventional cell phone is used directly without any change, it is preferable to use a mechanism of a shutter sound as a cell phone photographing detection function. If the shutter sound is changed to ultrasound beyond the audible range, more refined operational feeling is obtained. An optical sensor is not mounted on a normal (popular in Japan) cell phone. On the other hand, a sound is able to be picked up from the microphone in the earpiece of the cell phone and therefore no additional hardware is needed. In this respect, the use of sound is more advantageous in the case of communication, not between a cell phone and an electronic shelf label (ESL), but between a cell phone and a cell phone.

Figures 13, 14:
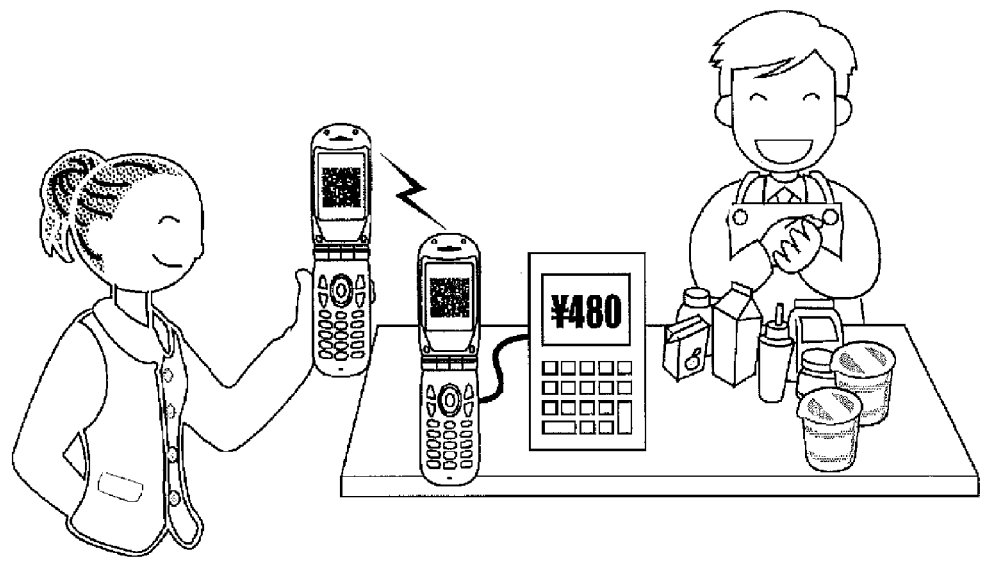
FIG. 13 is a diagram illustrating an image of using the cell phone as the electronic shelf label (ESL).
FIG. 14 is an example of electronic coupon information.

FIG. 13 shows a diagram illustrating an image of using a cell phone as an electronic shelf label (ESL).

An example of the use is as follows: a storekeeper registers the prices of items and information in an address book, for example, of a cell phone in a family type operation (private street store) in advance and causes the cell phone to display the item to be purchased by a shopper (almost all of cell phones have already been provided with the display screen). The shopper photographs the screen by using the shopper's cell phone camera, by which the checkout is performed. If a discount is applied to the price, only the price may be changed on the spot. The storekeeper is also able to be provided with a sales calculation service by using the buying behavior and habits analysis function of the checkout and analysis system. This enables the street store to achieve a simplified "store" or "in-store display."

Moreover, if a POS box having an external display and a keyboard is connected to the cell phone of the store (street store) keeper by using the USB, SD memory, or IO port of the cell phone, the cell phone is able to form a (simple) POS terminal (or a POS terminal serving as the electronic shelf label (ESL)). A cell phone not having a barcode reader function may be connected to an external barcode reader. In the communication used here, an encryption or other techniques may be appropriately used to improve security.

Embodiments of Buying Behavior Analysis

The buying behavior analysis is basically intended for an individual price, which is determined by applying one or more electronic coupons issued based on the sales promotion information of a manufacturer and a store on the basis of a personal purchase history to a normal shop price displayed on the electronic shelf label (ESL). The electronic coupon includes, for example, a coupon ID for coupon management, manufacturer/store information, an item ID, an applied discount rate, an expiration date, a quantity limit, a number-of-times limit, a questionnaire, and other information, as shown in FIG. 14. The coupons are generated based on sales promotion information of manufacturers and stores by the checkout and coupon management function 460 of the checkout and analysis system 400 at the time of checkout and transmitted to a mobile processing device (cell phone) and then stored into a shopping application so as to be used. All coupons are managed by the checkout and coupon management function 460 including the use of the coupons and falsification is checked at the checkout time.

Figure 15:
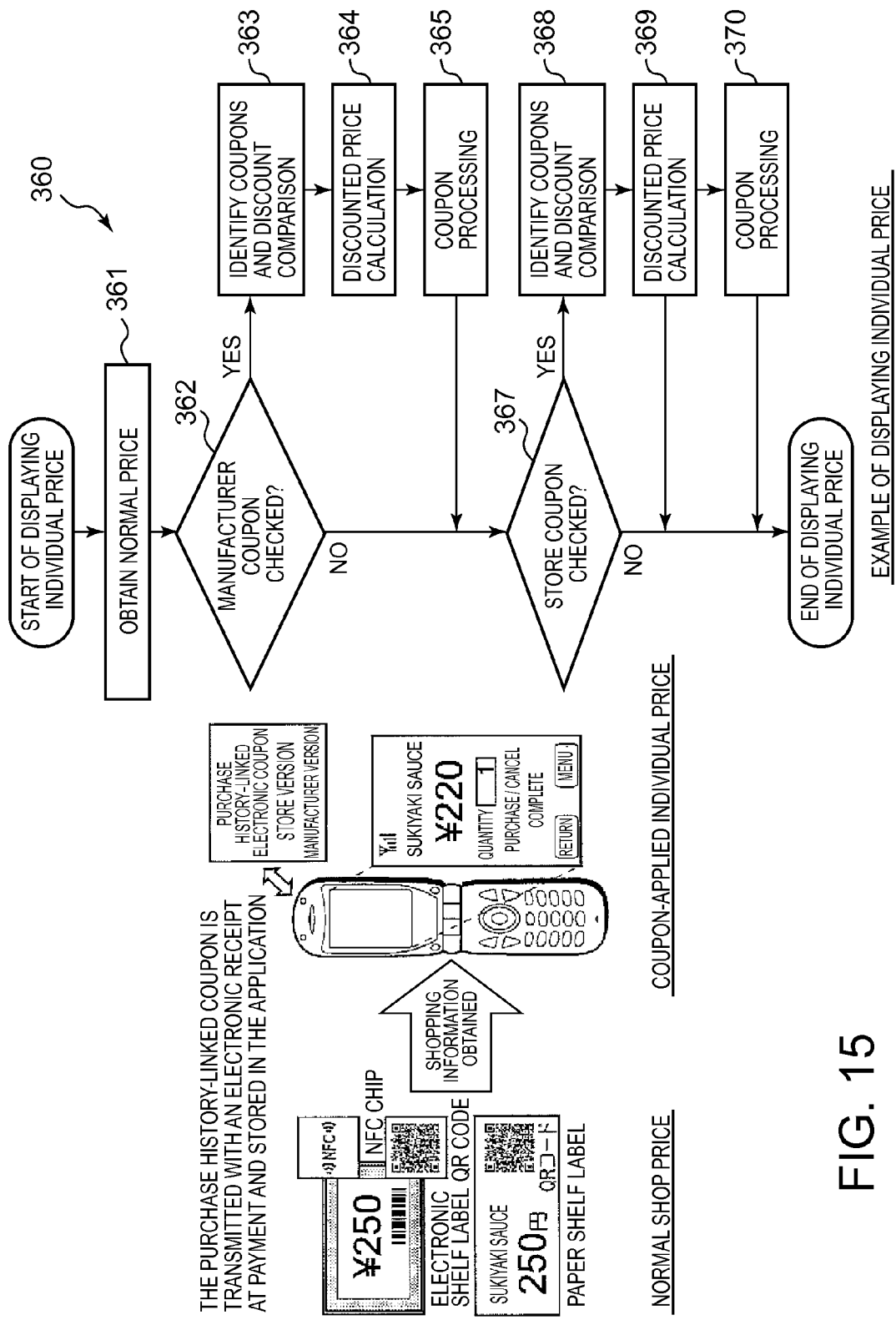
FIG. 15 is an example of a normal shop price, an individual price display, and a flowchart of displaying the individual price.

FIG. 15 shows images of respective prices and a flowchart of determining a price. In this specification, there is shown an example in which a coupon is applied to "sukiyaki sauce" (sukiyaki no tare) priced at 250 yen as its normal shop price and thereby the price is reduced to 220 yen. The shopping/display/checkout function 340 of the cell phone 300 photographs the electronic shelf label (ESL) on which the normal shop price 250 yen of the item is displayed in step 361 and then checks electronic coupons, which have been received at the time of previous checkouts from the checkout and coupon management function 460 in steps 362 and 367. Thereafter, the shopping/display/checkout function 340 compares the item information read from the two-dimensional barcode on the electronic shelf label (ESL) with the store information to select effective coupons in steps 363 and 368, calculates a price to which the discounts of the coupons are applied in steps 364 and 369, processes (change or deletion in the quantity or the number of times) the used coupons in steps 365 and 370, and then displays the individual price 220 yen on the screen of the cell phone. Therefore, the shopper is not informed of his or her individual price unless the normal shop price displayed on the electronic shelf label (ESL) is read into the shopper's cell phone. In other words, a shopper having an intention to purchase an item necessarily photographs its electronic shelf label (ESL).

If the price is appropriate, the shopper presses the purchase button immediately and shifts to the next purchase. If, however, the shopper thinks the price is high or hesitates about the purchase because the shopper wants to know the price of competing items, the shopper presses a cancel button and shifts to the next purchase. The shopping/display/checkout function 340 records these buying behaviors along with time stamps and transmits the records with the shopping information and the applied coupon information to the checkout and analysis system 400 at the checkout time.

In the checkout and analysis system 400, the checkout and coupon management function 460 manages the checkout and which coupon is used. The buying behavior and habits analysis function 420 analyzes the time stamp information to calculate the time period from the point at which the shopper looks at the individual price of the item to the point at which the shopper purchases the item, stores the information along with coupon use information so as to be sorted by stores and manufacturers, and uses them as information intended for stores and manufacturers. By additionally using the in-store traffic analysis function 440, it is possible to analyze the situation where the shopper looks at the price of certain item and then moves to a different place to check the price of different item and thereafter the shopper purchased the certain item.

Figure 16:
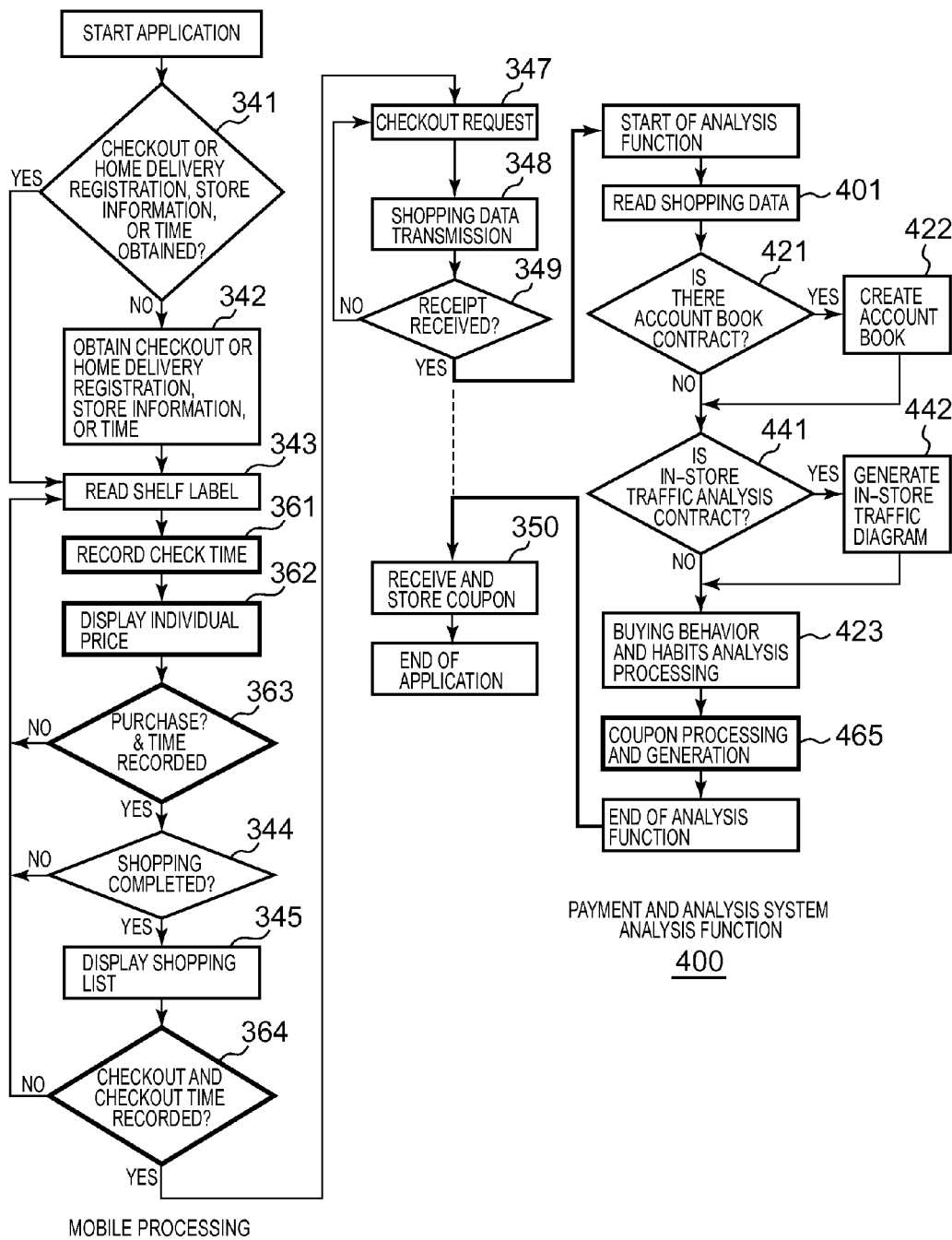
FIG. 16 is an example of a flowchart in the case of applying the individual price.

FIG. 16 shows a flowchart in the case of applying an individual price to the shopping/display/checkout function 340 of the mobile processing device in FIG. 7 and the checkout and analysis system 400 in FIG. 10 by using the buying history based coupon. The area enclosed by a thick line represents a function added anew: after reading the shelf label in step 361, the shopping/display/checkout function 340 records the time stamp in step 343 and then displays the individual price to which the coupon is applied in step 362. In step 364, the shopping/display/checkout function 340 records the time stamp immediately after the checkout. After the transmission of the shopping information in step 348, the checkout and analysis system 400 starts the analysis function. After buying habits analysis processing in step 423, the checkout and analysis system 400 performs the coupon processing and generation in step 465, and the control returns to coupon receiving and storing processing in step 350, by which the series of operations end.

In this manner, the coupon is generated according to the buying history with the linkage between the shopping/display/checkout function 340 of the mobile processing device and the checkout and analysis system 400. Therefore, it is preferable to use streaming computing in which a series of operations are performed in conjunction with each other.

In the individual price display, it is also possible to calculate and display the individual price by applying previously received coupons to the normal shop price read not only from the electronic shelf label (ESL), but also from a two-dimensional barcode, which should have been displayed on the electronic shelf label (ESL), printed on a conventional paper shelf label instead of displayed on the electronic shelf label (ESL) described above, or from a shelf label including an NFC chip.

The coupons are classified into those for specific items of a shop or a manufacturer (for example, a 2% discount) based on a buying history and a global discount (with 5% discount on all items). If a manufacturer coupon is used, the checkout and coupon management function 460 notifies the manufacturer coupon management system of the coupon use and charges the account. Thereby, the store is able to display a more attractive individual price by effectively using manufacturer's sales promotion expenses without reducing the store's own profit. Moreover, the manufacturer is able to grasp the coupon application condition accurately and to obtain information on the buying behavior and habits in an individual unit, and therefore the sales promotion expenses are able to be used more easily. Thereby, it is possible to offer such a prize on a nationwide basis that a reward of ten million yen is given to a shopper who purchased a certain item in a certain order.

Only by making shopping using this system, the shopper is able to purchase items at lower prices and further to obtain an incentive of possibly winning a prize automatically as described above, and therefore the use of this system is further accelerated.

In this system, the shopper is able to know the individual price only after making the cell phone read the display of the normal shop price, and therefore it is very important to record time stamps in order to analyze the buying behavior. It is because the shopper considers whether to purchase an item or not after looking at the price in the case where the shopper hesitates the purchase of the item.

Figure 17:
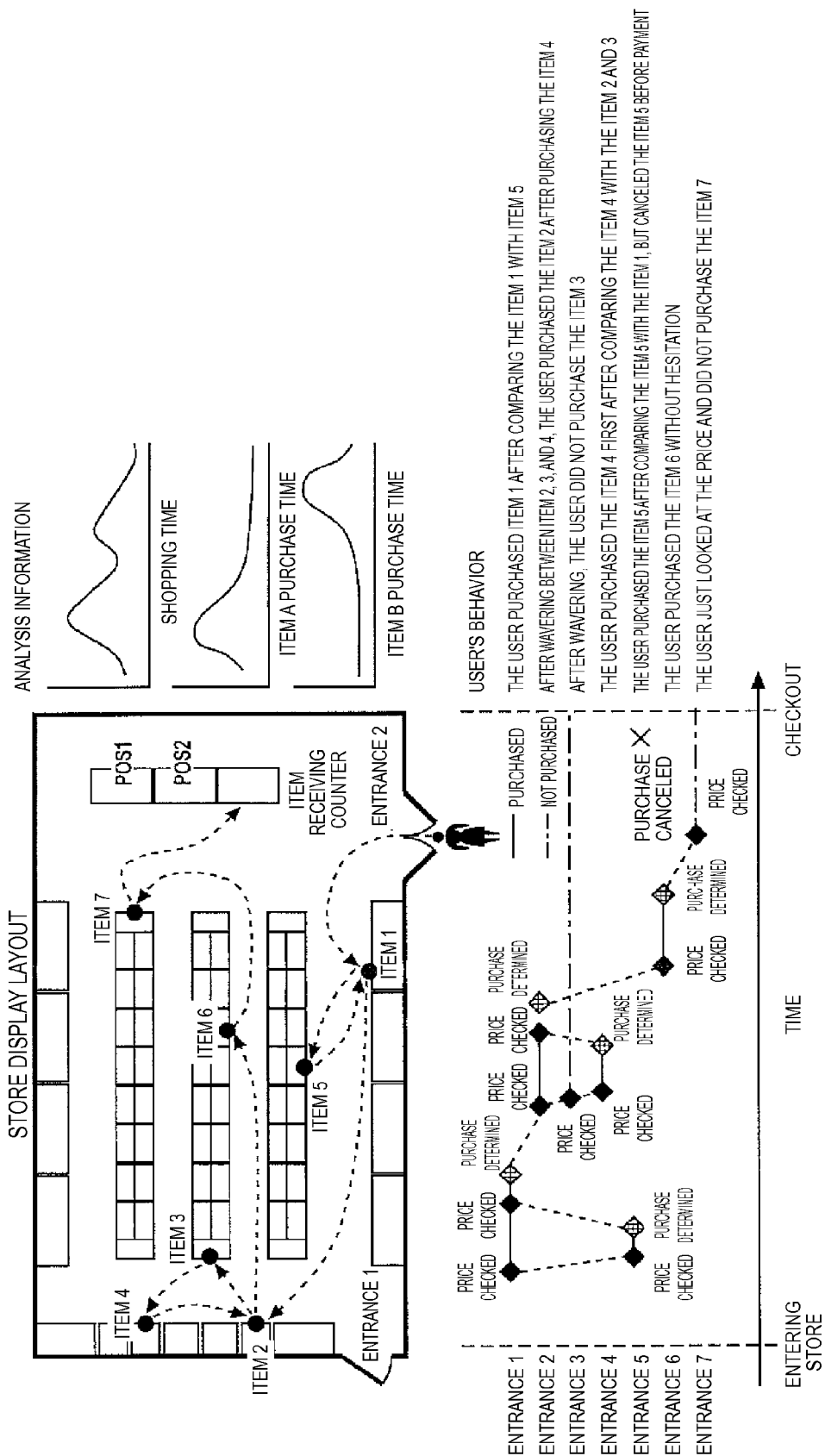
FIG. 17 is a diagram illustrating a flow of a shopper's buying behavior in the store.
Figure 18:
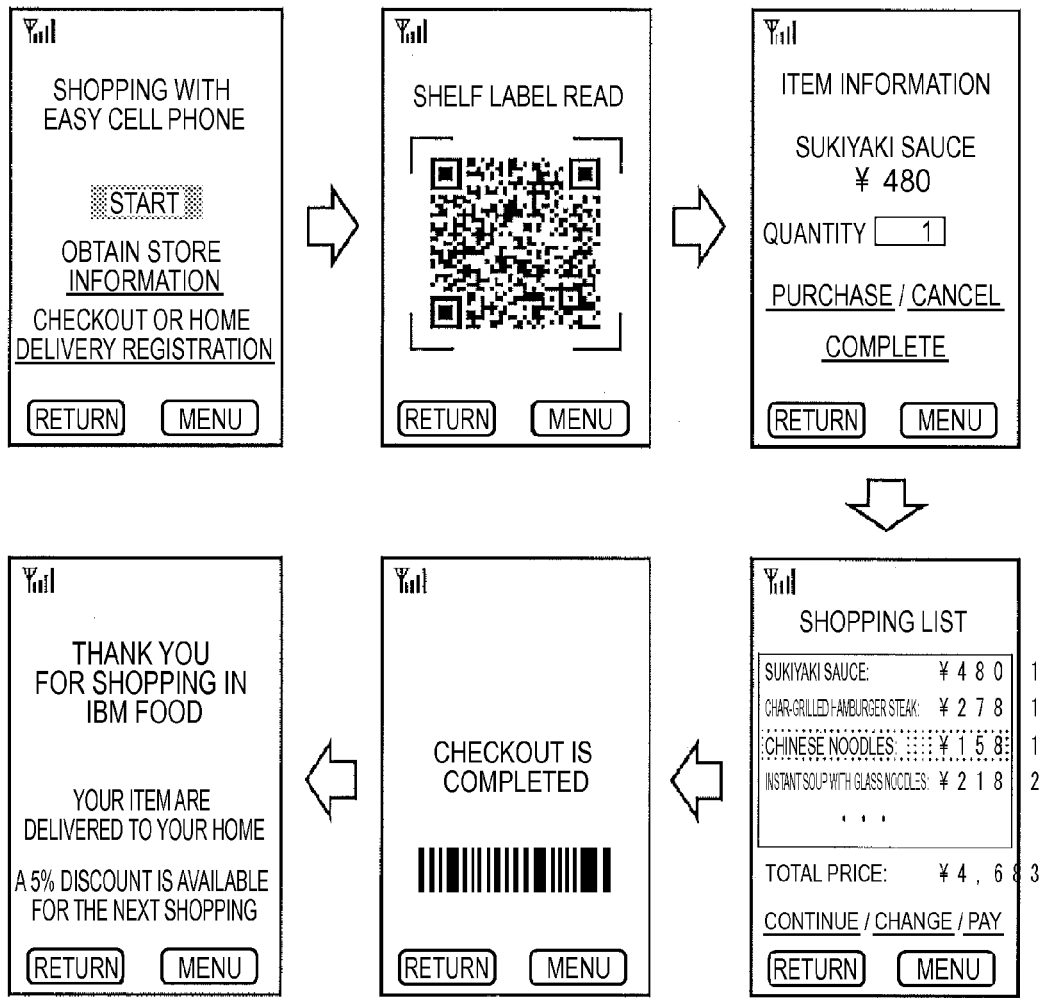
FIG. 18 is an example of screens for a shopping application in the cell phone for obtaining the buying behavior.
Figure 19:
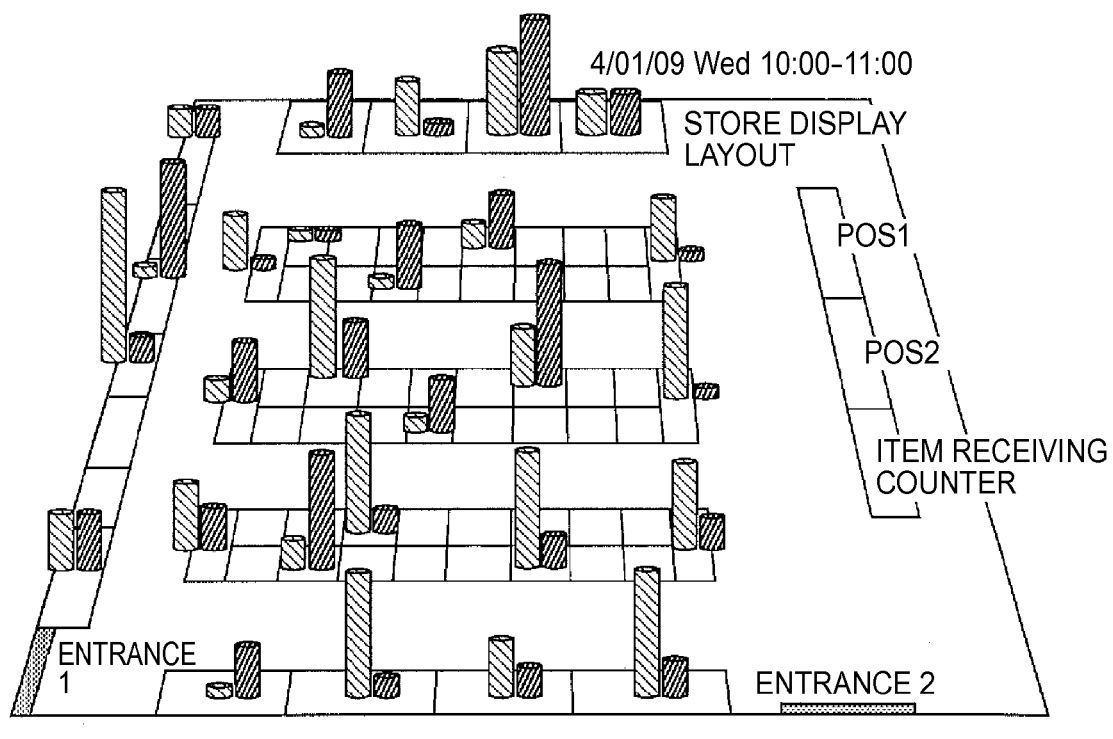
FIG. 19 is an example of a chart illustrating sales volumes and average purchase time of items.

FIG. 17 shows a flow of a shopper's buying behavior in a store. The shopper needs to obtain store information at entering the store and the time when the shopper obtains the store information is assumed to be the shopper's entry time. In addition, the time when the shopper makes checkout is assumed to be the shopper's checkout time. In FIG. 17, the rightmost point denotes the time when the shopper determined to purchase the items and pressed the button. The point on the left of the above point denotes the time when the shopper checked the individual price. In the case where the shopper hesitated and canceled and then looked at the items price of different items, the history in which the shopper checked the price over and over again is recorded. In addition, mark "x" denotes a cancel in the shopping list. In the example of the screens of the shopping application of the cell phone in FIG. 18, the underlined part corresponds to the respective buttons.

In this example, the shopper checked the price of items 1 after entering the store, and then checked the price of competing item 5 and purchased the item 5. After hesitating for a while, the shopper finally purchased item 1, too. Subsequently, the shopper hesitated to purchase competing items 2, 3, and 4 before purchasing item 4, and thereafter purchased item 2, also. As to item 3, the shopper only checked the price and finally did not purchase it. It is found with the traffic diagram in the store that, after purchasing item 2, the shopper purchased item 6 and then considered purchasing item 7, but did not purchase item 7 and canceled item 5 before checkout. Moreover, it is also possible to analyze the average shopping time and the distribution of purchase time for each item.

Eventually, the solid line indicates the purchased items and the dotted line indicates the items not purchased. By adding the attributes of the items to the above, it is also possible to analyze which competing items the shopper wavered over choosing and what the shopper purchased after wavering between them. Moreover, it is possible to design the sales floor more efficiently by performing the in-store traffic management in conformity to the order of purchasing items. In this manner, it becomes possible to grasp the shoppers' buying behaviors and thereby to obtain the buying behavior information which manufacturers are eager to know.

Thereby, it is possible to easily create a chart of the sales volume and the average purchase time of items, which has not been created by the conventional POS-based system, thereby enabling the setting of a new buying behavior analysis index.

Embodiments of Shopper Satisfaction Improvement

It is very important for a store to research shopper satisfaction and to aim at further improving the service by reflecting the result and thereby improving the sales. It is not easy, however, to obtain the information on the shopper satisfaction. In some stores, an opinion box or a questionnaire is placed and, if a shopper fills out the form, some incentive is given to the shopper. The filling out the form, however, is troublesome for a shopper and the shopper may forget to write his/her opinions in the form if the shopper purchased a lot of items.

Therefore, if this system is used to obtain some item information by using the electronic shelf label (ESL) and the coupon of the item has already been obtained and the coupon has the questionnaire attribute (FIG. 14), it is possible to insert a selection menu of, for example, five-degree satisfaction at the time of determining the purchase to obtain the shopper satisfaction information. In this case, a questionnaire menu is displayed immediately after obtaining each items information and therefore the load on the shopper is very low and it is possible to obtain the shopper satisfaction information in real time with respect to the correct target items. Moreover, it is also possible to increase the response rate of the questionnaire by giving an incentive such as issuing a new coupon to the shopper who answered the questionnaire.

What is claimed is:

1. A method in which a shopper obtains information about an item from an electronic shelf label (ESL) by using a mobile processing device in a store, the method comprising the steps of:

encoding a machine readable first image containing first information about an item;

generating a second image containing second information about the item;

displaying the machine readable first image on the ESL at frame intervals of a first specific period, wherein the machine readable first image is invisible to a shopper;

displaying the second image for the item on the ESL at frame intervals of a second specific period, wherein the second image is visible to the shopper;

obtaining the machine readable first image in synchronization with the frame interval of the first specific period with a time stamp by using a photographing function of the mobile processing device;

decoding the machine readable first image into first information about the item by the mobile processing device;

storing the decoded first information about the item and the time stamp in an internal memory of the mobile processing device; and performing a shopper operation on the mobile processing device that transmits the first decoded information about the item and the time stamp from the internal memory of the mobile processing device to an external data processing system, wherein shopping behavior and habits are analyzed upon the transmittance and shopping behavior and habits are analyzed using the first information about the item and the time stamp.

2. The method according to claim 1, further comprising the step of, before performing the steps of the method according to claim 1, downloading an application program having a function capable of sensing that the mobile processing device is getting close to the ESL into the mobile processing device by means of the mobile processing device.

3. The method according to claim 1, wherein information about the item includes the price of the item.

4. The method according to claim 1 wherein the mobile processing device is a cell phone owned by the shopper.

5. The method according to claim 2, wherein whether the mobile processing device is getting close is sensed by whether brightness, sound, or an amount of change in brightness or sound is equal to or greater than a setting.

6. The method according to claim 1, wherein a lighting function of the mobile processing device is used as a trigger for the ESL to detect the mobile processing device.

7. The method according to claim 1, wherein a cell phone is the ESL.

8. An electronic shelf label (ESL) comprising:
a function of displaying a price of an item;
a function of sensing that mobile processing device is getting close;
a function of encoding a machine readable first image containing first information about an item:
a function of generating a second image containing second information about the item;
a function of displaying the machine readable first image on the ESL at frame intervals of a first specific period, wherein the machine readable first image is invisible to a shopper;
a function of displaying the second image for the item on the ESL at frame intervals of a second specific period, wherein the second image is visible to the shopper;
a function of obtaining the machine readable first image in synchronization with the frame interval of the first specific period with a time stamp by using a photographing function of the mobile processing device;
a function of decoding the machine readable first image into first information about the item by the mobile processing device;
a function of storing the decoded first information about the item and the time stamp in an internal memory of the mobile processing device; and
a function of performing a shopper operation on the mobile processing device that transmits the first decoded information about the item and the time stamp from the internal memory of the mobile processing device to an external data processing system,
wherein shopping behavior and habits are analyzed upon the transmittance and shopping behavior and habits are analyzed using the first information about the item and the time stamp, and
wherein the state of displaying the price of the item is switched to the state of displaying the second image encoded into the image in response to sensing that the mobile processing device is getting close.

9. The ESL according to claim 8, wherein the second image includes the price of the item which is obtained from a POS system.

10. The ESL according to claim 8, implemented in a cell phone by downloading the plurality of functions into the cell phone.

11. The ESL according to claim 8, wherein a display of the ESL is implemented by connection with an external display.

12. The ESL according to claim 8, wherein whether the mobile processing device is getting close is sensed by whether brightness, sound, or amount of change in brightness or sound is equal to or greater than a setting.

13. The ESL according to claim 8, wherein a lighting function of the mobile processing device is used as a trigger for the electronic shelf label (ESL) to detect the mobile processing device.

14. A method of displaying an item by a shopkeeper using an electronic shelf label (ESL), comprising the steps of:
displaying only a sample item in a store;
encoding a machine readable first image containing first information about an item;
generating a second image containing second information about the item;
displaying the machine readable first image on the ESL at frame intervals of a first specific period, wherein the machine readable first image is invisible to a shopper;
displaying the second image for the item on the ESL at frame intervals of a second specific period, wherein the second image is visible to the shopper;
obtaining the machine readable first image in synchronization with the frame interval of the first specific period with a time stamp by using a photographing function of the mobile processing device;
decoding the machine readable first image into first information about the item by the mobile processing device;
storing the decoded first information about the item and the time stamp in an internal memory of the mobile processing device; and
performing a shopper operation on the mobile processing device that transmits the first decoded information about the item and the time stamp from the internal memory of the mobile processing device to an external data processing system,
wherein shopping behavior and habits are analyzed upon the transmittance and shopping behavior and habits are analyzed using the first information about the item and the time stamp.

15. A program product causing an electronic shelf label (ESL) and a mobile processing device to implement the steps of:
displaying a price an item on the ESL;
encoding a machine readable first image containing first information about an item;
generating a second image containing second information about the item;
displaying the machine readable first image on the ESL at frame intervals of a first specific period, wherein the machine readable first image is invisible to a shopper;
switching the state of displaying the price of the item to the state of displaying the second image for the item on the ESL at frame intervals of a second specific period upon sensing that the mobile processing device is getting close, wherein the second image is visible to the shopper;
obtaining the machine readable first image in synchronization with the frame interval of the first specific period with a time stamp by using a photographing function of the mobile processing device;
decoding the machine readable first image into first information about the item by the mobile processing device;

storing the decoded first information about the item and the time stamp in an internal memory of the mobile processing device; and performing a shopper operation on the mobile processing device that transmits the first decoded information about the item and the time stamp from the internal memory of the mobile processing device to an external data processing system, wherein shopping behavior and habits are analyzed upon the transmittance and shopping behavior and habits are analyzed using the first information about the item and the time stamp.

16. A system in which a shopper obtains contents associated with an item provided with an electronic shelf label (ESL) by using a mobile processing device in a store, the system comprising:

means for encoding a machine readable first image containing first information about an item:

means for generating a second image containing second information about the item;

means for displaying the machine readable first image on the ESL at frame intervals of a first specific period, wherein the machine readable first image is invisible to a shopper;

means for displaying the second image for the item on the ESL at frame intervals of a second specific period, wherein the second image is visible to the shopper;

means for obtaining the machine readable first image in synchronization with the frame interval of the first specific period with a time stamp by using a photographing function of the mobile processing device;

means for decoding the machine readable first image into first information about the item by the mobile processing device;

means for storing the decoded first information about the item and the time stamp in an internal memory of the mobile processing device; and in response to a shopper operation on the mobile processing device, means for transmitting the first decoded information about the item and the time stamp from the internal memory of the mobile processing device to an external data processing system, wherein shopping behavior and habits are analyzed upon the transmittance and shopping behavior and habits are analyzed using the first information about the item and the time stamp.

* * * * *